(12) United States Patent
Park et al.

(10) Patent No.: US 10,890,697 B2
(45) Date of Patent: Jan. 12, 2021

(54) COMPOSITE OPTICAL SHEET AND LIQUID CRYSTAL DISPLAY DEVICE INCLUDING THE SAME

(71) Applicant: Samsung Display Co., Ltd., Yongin-si (KR)

(72) Inventors: Young Min Park, Hwaseong-si (KR); Do Hun Kim, Suwon-si (KR); Hyun Hyang Kim, Suwon-si (KR); Ji Eun Nam, Seoul (KR); Taek Sun Shin, Yongin-si (KR)

(73) Assignee: Samsung Display Co., Ltd.

( * ) Notice: Subject to any disclaimer, the term of this patent is extended or adjusted under 35 U.S.C. 154(b) by 239 days.

(21) Appl. No.: 15/791,075

(22) Filed: Oct. 23, 2017

(65) Prior Publication Data

US 2018/0372930 A1    Dec. 27, 2018

(30) Foreign Application Priority Data

Jun. 23, 2017 (KR) .......................... 10-2017-0079877

(51) Int. Cl.
*G02B 5/02* (2006.01)
*G02F 1/1335* (2006.01)
(Continued)

(52) U.S. Cl.
CPC ............. *G02B 5/0278* (2013.01); *G02B 1/04* (2013.01); *G02B 5/0226* (2013.01);
(Continued)

(58) Field of Classification Search
CPC .......... G02B 5/02–0247; G02B 5/0268; G02B 5/0273; G02B 5/0278; G02B 5/04;
(Continued)

(56) References Cited

U.S. PATENT DOCUMENTS 9,001,424 B2   4/2015  Sun et al.
2008/0002256 A1  1/2008  Sasagawa et al.
(Continued)

FOREIGN PATENT DOCUMENTS

JP         2012008600 A    12/2012
KR    1020070084212 A     4/2006
(Continued)

*Primary Examiner* — Stephone B Allen
*Assistant Examiner* — Adam W Booher
(74) *Attorney, Agent, or Firm* — Innovation Counsel LLP

(57) ABSTRACT

Provided are a composite optical sheet and a liquid crystal display device including the same. The composite optical sheet includes: a first optical functional layer having a first surface and a second surface, the first surface including a reference plane and a pattern of recesses dented from the reference plane; a first support layer disposed on the first surface of the first optical functional layer; a first adhesive layer disposed between the first optical functional layer and the first support layer, wherein the first optical functional layer is coupled with the first adhesive layer by penetrating into the first adhesive layer at least partially; a second optical functional layer disposed on the first support layer and including a pattern of prisms extended in a first direction; a polarizing layer disposed on the second optical functional layer; and a second adhesive layer disposed between the second optical functional layer and the polarizing layer, wherein the second optical functional layer is coupled with the second adhesive layer by penetrating into the second adhesive layer at least partially.

20 Claims, 20 Drawing Sheets

(51) Int. Cl.
*G02B 1/04* (2006.01)
*G02F 1/13357* (2006.01)
*G02B 5/30* (2006.01)

(52) U.S. Cl.
CPC ............ *G02B 5/0268* (2013.01); *G02B 5/305* (2013.01); *G02F 1/133528* (2013.01); *G02F 1/133606* (2013.01)

(58) Field of Classification Search
CPC ........ G02B 5/045; G02B 5/30; G02B 5/3025; G02B 5/3033; G02B 5/3041; G02B 5/305; G02B 1/04; G02F 1/133528; G02F 1/133606
See application file for complete search history.

(56) References Cited

U.S. PATENT DOCUMENTS

| | | | | |
|---|---|---|---|---|
| 2008/0049330 | A1* | 2/2008 | Tolbert | G02F 1/133606 359/599 |
| 2011/0181635 | A1* | 7/2011 | Kabe | G09G 3/3607 345/694 |
| 2011/0280004 | A1* | 11/2011 | Shimada | G02B 3/0056 362/97.1 |
| 2014/0340911 | A1* | 11/2014 | Woo | G02B 5/0242 362/311.03 |
| 2017/0315402 | A1* | 11/2017 | Kashiwagi | G02F 1/133606 |
| 2018/0307092 | A1* | 10/2018 | Lin | G02F 1/133504 |

FOREIGN PATENT DOCUMENTS

| | | |
|---|---|---|
| KR | 1020070109860 A | 11/2007 |
| KR | 1020090047485 A | 5/2009 |
| KR | 1020090123527 A | 12/2009 |
| KR | 101236683 B1 | 2/2013 |
| KR | 101407440 B1 | 6/2014 |
| KR | 1020130040887 A | 10/2014 |
| KR | 1020160135546 A | 5/2015 |
| KR | 1020160070714 A | 6/2016 |
| KR | 1020160080679 A | 7/2016 |
| KR | 1020160082340 A | 7/2016 |
| KR | 101660290 B1 | 9/2016 |
| KR | 1020160143079 A | 12/2016 |
| KR | 101701500 B1 | 2/2017 |
| KR | 101723790 B1 | 4/2017 |

* cited by examiner

COMPOSITE OPTICAL SHEET AND LIQUID CRYSTAL DISPLAY DEVICE INCLUDING THE SAME

This application claims priority to Korean Patent Application No. 10-2017-0079877, filed on Jun. 23, 2017, in the Korean Intellectual Property Office, and all the benefits accruing therefrom under 35 U.S.C. § 119, the disclosure of which is incorporated by reference in its entirety.

BACKGROUND

1. Field of the Disclosure

Exemplary embodiments of the present disclosure relate to a composite optical sheet, and a liquid-crystal display device including the same.

2. Description of the Related Art

A liquid-crystal display device is one of the most commonly used display devices. Typically, a liquid-crystal display device includes a light source, a light guide plate that guides light provided from the light source, and a liquid-crystal display panel including a liquid-crystal layer.

In order to improve display quality, a liquid-crystal display device may further include a plurality of optical sheets disposed on a path from a light source to a display panel. The plurality of optical sheets may include a light-concentrating sheet such as a prism sheet, a polarizing sheet, and the like, to modulate a path and/or a polarization state of the light provided from the light source.

Generally, a display device includes one or more optical sheets that are disposed sheet by sheet and spaced apart from one another. Such optical sheets make it difficult to reduce the thickness of liquid-crystal display devices. Further, the optical sheets disposed sheet by sheet can have a problem of being warped or wrinkled due to their own weight. This problem may become more serious as liquid-crystal display devices become larger and the bezel becomes thinner.

SUMMARY

Aspects of the present disclosure provide a composite optical sheet capable of reducing the thickness of a liquid-crystal display device while realizing the intended optical modulation characteristics.

Aspects of the present disclosure also provide a liquid-crystal display device with a small thickness and a good display quality.

These and other aspects, embodiments and advantages of the present disclosure will become immediately apparent to those of ordinary skill in the art upon review of the Detailed Description and Claims to follow.

According to an exemplary embodiment of the present disclosure, a composite optical sheet includes: a first optical functional layer having a first surface and a second surface, the first surface including a reference plane and a pattern of recesses dented from the reference plane; a first support layer disposed on the first surface of the first optical functional layer; a first adhesive layer disposed between the first optical functional layer and the first support layer, wherein the first optical functional layer is coupled with the first adhesive layer by penetrating into the first adhesive layer at least partially; a second optical functional layer disposed on the first support layer and including a pattern of prisms extended in a first direction; a polarizing layer disposed on the second optical functional layer; and a second adhesive layer disposed between the second optical functional layer and the polarizing layer, wherein the second optical functional layer is coupled with the second adhesive layer by penetrating into the second adhesive layer at least partially.

In an exemplary embodiment, the composite optical sheet may further include: a second support layer disposed on the second surface of the first optical functional layer and having a surface facing the first optical functional layer and an opposed surface; and a first bead coating layer disposed on the opposed surface of the second support layer and including a plurality of first beads and a first binder resin surrounding the plurality of first beads.

In an exemplary embodiment, the composite optical sheet may further include: a second bead coating layer disposed directly on the polarizing layer and including a plurality of second beads and a second binder resin surrounding the plurality of second beads, wherein a number of the first beads per unit area in the first bead coating layer may be smaller than a number of the second beads per unit area in the second bead coating layer.

In an exemplary embodiment, the first optical functional layer and the second optical functional layer may be made of a photo-curable resin, wherein the first binder resin and the second binder resin may be made of a thermosetting resin, and wherein an elasticity of the plurality of first beads may be larger than an elasticity of the plurality of second beads.

In an exemplary embodiment, a pitch of the pattern of prisms may be equal to three times to seven times of an average particle size of the plurality of second beads in the second bead coating layer.

In an exemplary embodiment, the composite optical sheet may further include: a third support layer disposed between the second adhesive layer and the polarizing layer and being in contact and coupled with the second adhesive layer, wherein the first support layer, the second support layer and the third support layer may have an in-plane refractive index anisotropy, and wherein a direction of a slow axis of each of the first support layer, that of the second support layer and that of the third support layer may be parallel to one another.

In an exemplary embodiment, the pattern of prisms may include a first pattern of prisms extended in the first direction and having a first height, and a second pattern of prisms disposed adjacent to the first pattern of prisms, extended in the first direction, and having a second height that is smaller than the first height, wherein the first pattern of prisms may be coupled with the second adhesive layer by penetrating into the second adhesive layer at least partially, and wherein the second pattern of prisms may be spaced apart from the second adhesive layer.

In an exemplary embodiment, the first optical functional layer may be a light-concentrating layer, wherein a maximum thickness of the first optical functional layer may be smaller than a thickness of the first support layer and a thickness of the second support layer, wherein the first optical functional layer may be spaced apart from the first support layer, and wherein the composite optical sheet may be used for an edge-type light source assembly.

In an exemplary embodiment, the composite optical sheet may further include: a second bead coating layer disposed directly on the polarizing layer and including a plurality of second beads, wherein an average width of the pattern of recesses in a second direction intersecting the first direction may be larger than an average particle size of the plurality of second beads.

In an exemplary embodiment, the pattern of recesses may include a first pattern of recesses and a second pattern of recesses, wherein the second adhesive layer may fill the first pattern of recesses and the second pattern of recesses at least partially, and wherein a level of a surface of the second adhesive layer filling the first pattern of recesses may be different from a level of a surface of the second adhesive layer filling the second pattern of recesses.

In an exemplary embodiment, the first optical functional layer may include more than one pattern of recesses having dots shapes when viewed from a top, and wherein an area occupied by the reference plane with respect to an overall area of the first optical functional layer may range from 30% to 50%, when viewed from the top.

In an exemplary embodiment, a width of the pattern of recesses in the first direction may be larger than a width of the pattern of recesses in a second direction intersecting the first direction when viewed from the top.

In an exemplary embodiment, the pattern of recesses may include a first pattern of recesses having a cross section that is a part of a first arc having a first curvature radius and a first depth, and a second pattern of recesses having a cross section that is a part of a second arc having the first curvature radius and a second depth that is larger than the first depth.

In an exemplary embodiment, the pattern of recesses may include a first pattern of recesses having a first depth and a first width in the first direction that is larger than the first depth, and a second pattern of recesses having a second depth and a second width in the first direction that is smaller than the second depth.

According to another exemplary embodiment of the present disclosure, a composite optical sheet includes: a first support layer; a bead coating layer disposed on the first support layer and including a plurality of first beads having a first particle size and a plurality of second beads having a second particle size that is smaller than the first particle size; a second support layer disposed on the bead coating layer; a first adhesive layer disposed between the bead coating layer and the second support layer, wherein the plurality of first beads in the first bead coating layer are coupled with the first adhesive layer by penetrating into the first adhesive layer at least partially; a prism pattern layer disposed on the second support layer; a polarizing layer disposed on the prism pattern layer; and a second adhesive layer disposed between the prism pattern layer and the polarizing layer, wherein the prism pattern layer is coupled with the second adhesive layer by penetrating into the second adhesive layer at least partially.

In an exemplary embodiment, the first particle size may be equal to or greater than 20 μm, and wherein the plurality of second beads may be spaced apart from the first adhesive layer.

According to an exemplary embodiment of the present disclosure, there is provided a liquid-crystal display device. The liquid crystal display device including: a light guide plate; a liquid-crystal display panel disposed on the light guide plate; a composite optical sheet interposed between the light guide plate and the liquid-crystal display panel; and a light source disposed on a side of the light guide plate in a first direction, wherein the composite optical sheet includes: a first optical functional layer having a first surface and a second surface, the first surface including a reference plane and a pattern of recesses dented from the reference plane; a first support layer disposed on the first surface of the first optical functional layer; a first adhesive layer disposed between the first optical functional layer and the first support layer, wherein the first optical functional layer is coupled with the first adhesive layer by penetrating into the first adhesive layer at least partially; a second optical functional layer disposed on the first support layer and including a pattern of prisms extended in a second direction intersecting the first direction; a first polarizing layer disposed on the second optical functional layer; and a second adhesive layer disposed between the second optical functional layer and the first polarizing layer, wherein the second optical functional layer is coupled with the second adhesive layer by penetrating into the second adhesive layer at least partially.

In an exemplary embodiment, the display device may further include: a second polarizing layer disposed between the composite optical sheet and the liquid-crystal display panel, wherein a maximum distance between the composite optical sheet and the second polarizing layer may be equal to or smaller than 100 μm.

In an exemplary embodiment, the liquid-crystal display panel may include a first glass and a second glass facing each other, and a liquid-crystal layer interposed between the first and the second glasses, wherein the light guide plate may be made of a glass material, and wherein the liquid-crystal display device further includes a coupling member that is in contact with the light guide plate and the first glass and couples the light guide plate with the first glass.

In an exemplary embodiment, the display device may further include: a housing accommodating the light guide plate, the light source and the composite optical sheet, wherein the housing may include a bottom portion, side walls protruding upwardly from the bottom portion, and supporters protruding inwardly from the side walls to overlap with the composite optical sheet and supporting the liquid-crystal display panel, and wherein the supporters may be disposed between the composite optical sheet and the second polarizing layer and may be in contact with the composite optical sheet.

According to an exemplary embodiment of the present disclosure, a composite optical sheet can provide improved luminance without being warped or wrinkled, and can also provide a good coupling force to improve rigidity and durability.

Further, according to an exemplary embodiment of the present disclosure, the thickness of a liquid-crystal display device can be reduced to be able to realize a narrow bezel.

It should be noted that effects of the present disclosure are not limited to those described above and other effects of the present disclosure will be apparent to those skilled in the art from the following descriptions.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE EMBODIMENTS

Figure 1:
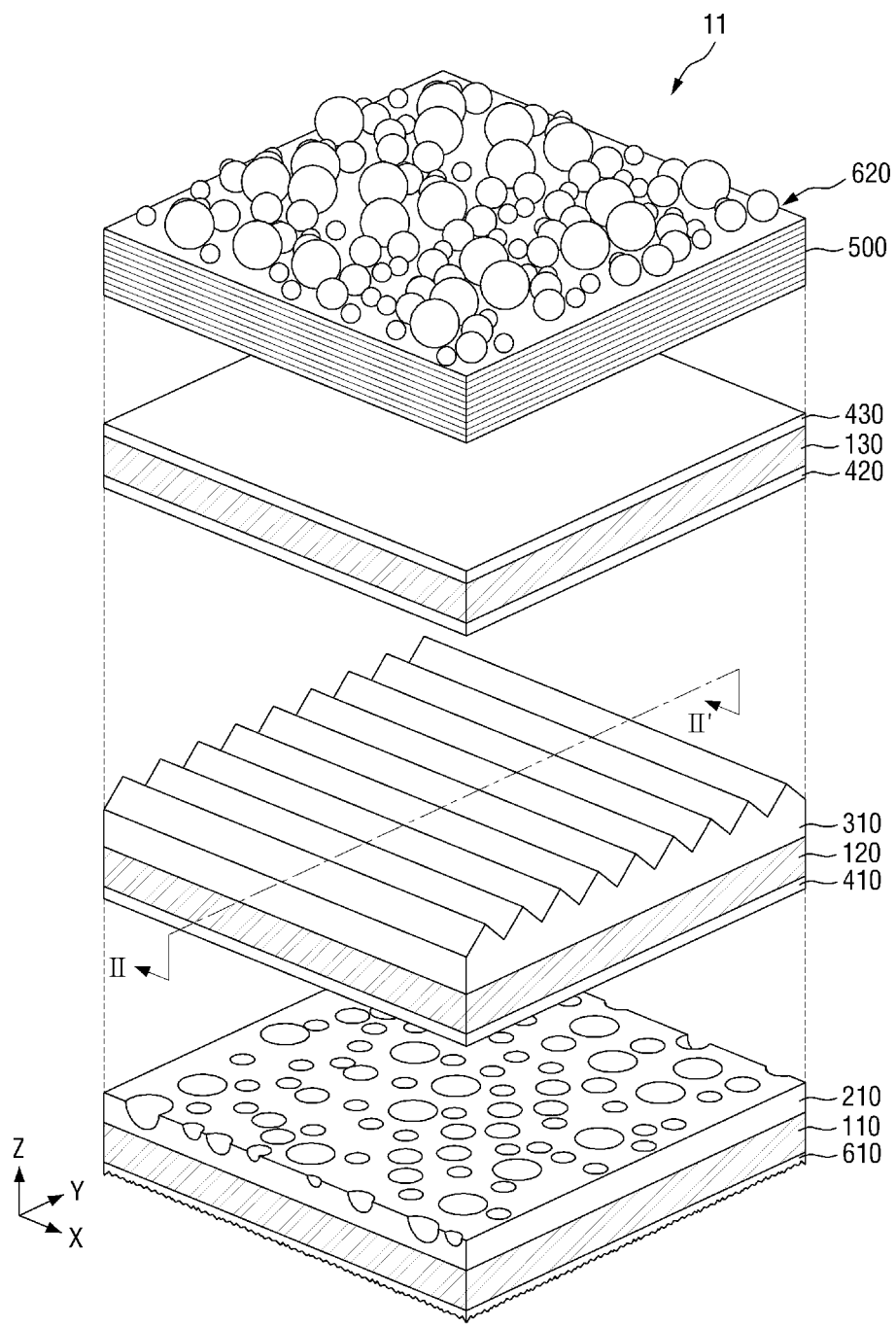
FIG. 1 is an exploded perspective view of a composite optical sheet according to an exemplary embodiment.

Features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the present disclosure to those skilled in the art.

It will be understood that when an element or layer is referred to as being "on," "connected to," or "coupled to" another element or layer, the element or layer can be directly on, connected or coupled to another element or layer or one or more intervening elements or layers. In contrast, when an element is referred to as being "directly on," "directly connected to" or "directly coupled to" another element or layer, there may be no intervening elements or layers present. As used herein, connected may refer to elements being physically, electrically, optically, and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present disclosure.

Spatially relative terms, such as "below," "lower," "under," "above," "upper," and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if a device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations), and the spatially relative descriptors used herein may be interpreted accordingly.

The terminology used herein is for the purpose of describing particular embodiments only and is not intended to be limiting. As used herein, the singular forms "a," "an," and "the" are intended to include the plural forms as well, including "at least one," unless the context clearly indicates otherwise. It will be further understood that the terms "comprises," "comprising," "includes," and/or "including," when used in this specification, specify the presence of stated features, integers, operations, elements, and/or components, but do not preclude the presence or addition of one or more other features, integers, steps, operations, elements, components, and/or groups thereof. "At least one" is not to be construed as limiting "a" or "an." "Or" means "and/or." As used herein, the term "and/or" includes any and all combinations of one or more of the associated listed items.

As used herein, the term first direction X refers to a direction in a plane, the term second direction Y refers to a direction intersecting the first direction X in the plane, and the term third direction Z refers to a direction perpendicular to the plane.

Hereinafter, exemplary embodiments of the present disclosure will be described with reference to the accompanying drawings.

Figure 2:
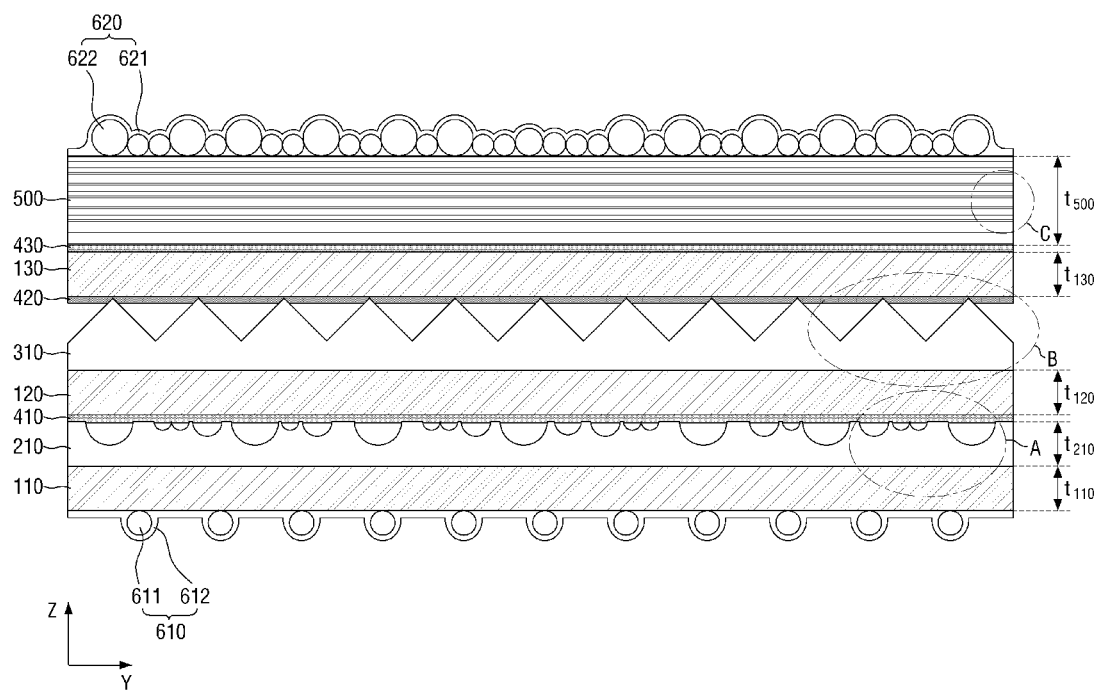
FIG. 2 is a cross-sectional view taken along line II-II' in FIG. 1.
Figure 3:
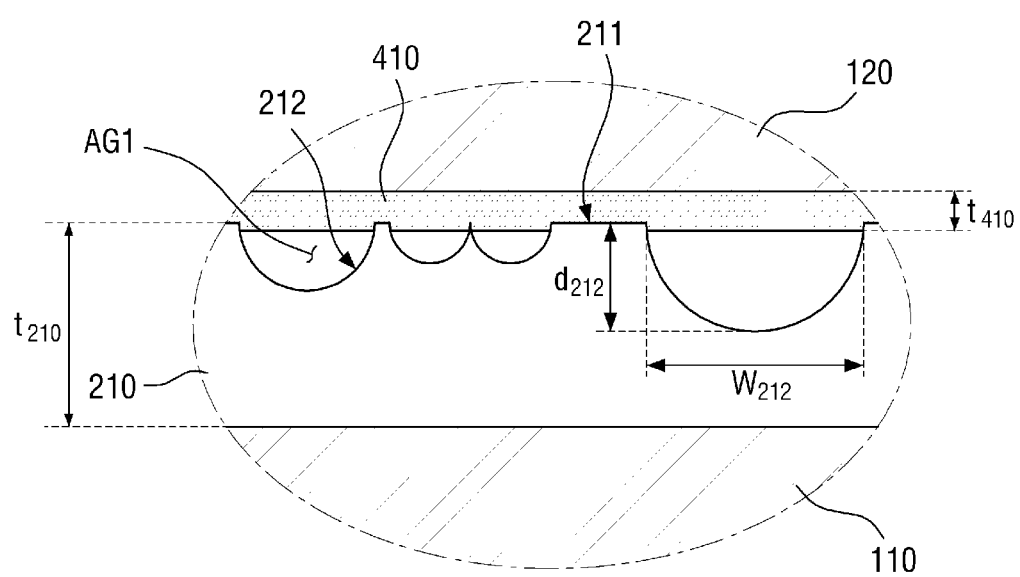
FIG. 3 is an enlarged view of portion A of FIG. 2.
Figure 4:
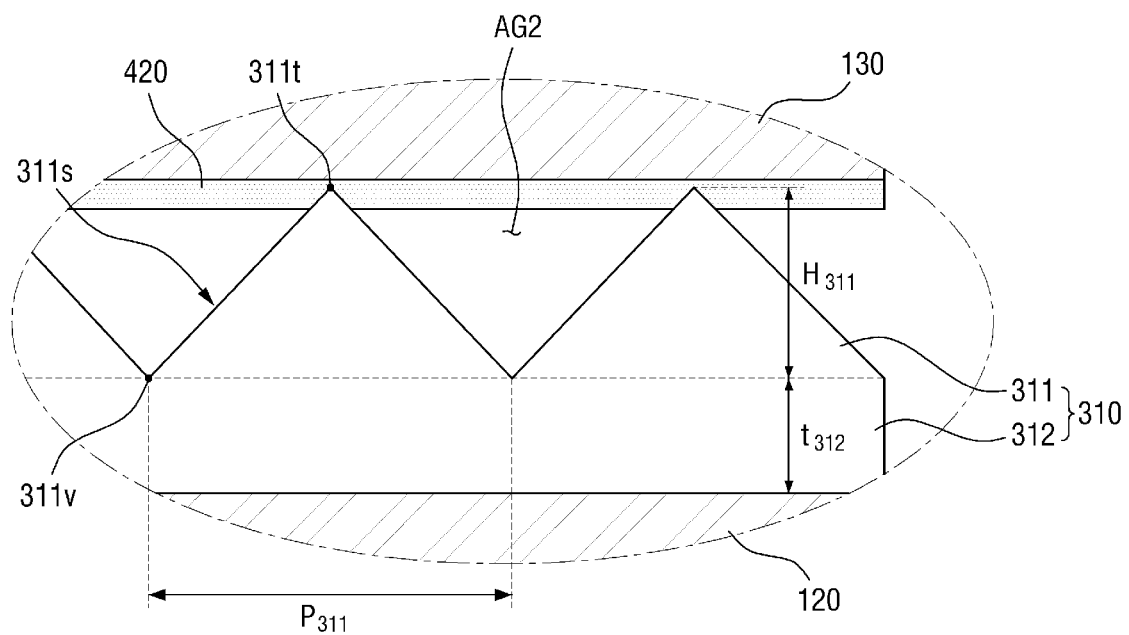
FIG. 4 is an enlarged view of portion B of FIG. 2.
Figure 5:
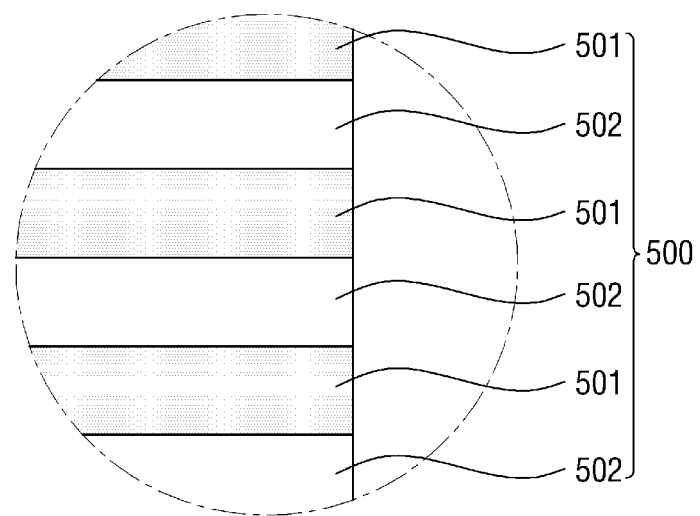
FIG. 5 is an enlarged view of portion C of FIG. 2.

FIG. 1 is an exploded perspective view of a composite optical sheet according to an exemplary embodiment. FIG. 2 is a cross-sectional view taken along line II-II' in FIG. 1. FIG. 3 is an enlarged view of portion A of FIG. 2. FIG. 4 is an enlarged view of portion B of FIG. 2. FIG. 5 is an enlarged view of portion C of FIG. 2.

Referring to FIGS. 1 to 5, the composite optical sheet 11 according to the exemplary embodiment of the present disclosure includes a first support layer 110, a first optical functional layer 210 disposed on the first support layer 110, a second support layer 120 disposed on the first optical functional layer 210, a second optical functional layer 310 disposed on the second support layer 120, and a polarizing layer 500 disposed on the second optical functional layer 310. The composite optical sheet 11 according to the exemplary embodiment of the present disclosure may be used for, but is not limited to, an edge-type light source assembly.

The first support layer 110 supports the first optical functional layer 210 disposed thereon and enhances the rigidity of the composite optical sheet 11. The first support layer 110 may be made of a light-transmitting material. For example, the first support layer 110 may be formed of a polycarbonate resin, a polysulfone resin, a polyacrylate resin, a polystyrene resin, a polyvinyl alcohol resin, a polyethylene terephthalate resin, or the like. In some embodiments, the first support layer 110 may have an in-plane refractive index anisotropy. The thickness $t_{110}$ of the first support layer 110 may range approximately from 40 micrometer (μm) to 60 μm.

The first optical functional layer 210 may be disposed on the first support layer 110. The first optical functional layer 210 serves to concentrate the light incident from below the composite optical sheet 11 firstly. That is, the first optical functional layer 210 may be a light-concentrating layer that concentrates at least a part of light incident from below the composite optical sheet 11. For example, the light incident from below the composite optical sheet 11 can be modulated by the first optical functional layer 210 such that the exit angle is smaller than the incident angle. That is, the first optical functional layer 210 may modulate the optical path so that incident light becomes normal to the composite optical sheet 11. The first optical functional layer 210 may be made of a photo-curable resin.

In an exemplary embodiment, one surface (upper surface in the drawing) of the first optical functional layer 210 may include a reference plane 211, and a pattern of recesses 212 dented inwardly of the reference plane 211. The inner surface of the pattern of recesses 212 may be curved.

The surface (upper surface in the drawings) of the first optical film 210 facing the second optical functional layer 310 and the polarizing layer 500 forms an optical interface that can refract transmitted light, such that the transmitted light can be refracted more closely to the normal to the composite optical sheet 11. In addition, the thickness of the composite optical sheet 11 can be reduced further, such that a degree of freedom in designing components that may be disposed below the first optical functional layer 210 can be increased. In addition, a first bead coating layer 610 may be formed below the first optical functional layer 210 to prevent the composite optical sheet 11 from being too close to a light guide plate (not shown), thereby preventing a stain from being seen from the outside.

The reference plane 211 may form the top surface of the first optical functional layer 210 defining the maximum thickness $t_{210}$ of the first optical functional layer 210. The reference plane 211 may be substantially flat. As used herein, the expression "flat surface" not only refers to a completely flat surface when the composite optical sheet 11 is placed on a plane, but also encompasses a surface having a certain surface roughness within a fabrication tolerance.

The area occupied by the reference plane 211 with respect to the entire area of the first optical functional layer 210 when viewed from the top may be approximately 30% to 50%. If the reference plane 211 occupies 30% or larger of the area of the upper surface of the first optical functional layer 210, a sufficient coupling force between the first optical functional layer 210 and the first adhesive layer 410 to be described below can be obtained. If the reference plane 211 occupies 50% or smaller of the area of the upper surface of the first optical functional layer 210, the pattern of recesses 212 can sufficiently concentrate light.

The pattern of recesses 212 may have dots shapes when viewed from the top. For example, the pattern of recesses 212 may have circular shapes when viewed from the top. In the cross-sectional view taken along the second direction Y, the cross section of each of the pattern of recesses 212 may be a part of an arc. In an exemplary embodiment, the cross section of each recess of the pattern of recesses 212 may be a substantially half circle. The inner surface of the pattern of recesses 212 may change an optical path of the transmitted light by refracting the transmitted light. The pattern of recesses 212 may be arranged irregularly when viewed from the top.

The pattern of recesses 212 may have different sizes. For example, the depth $d_{212}$ of the pattern of recesses 212 may range from approximately 2 μm to 15 μm. The width $W_{212}$ of the pattern of recesses 212 in the second direction Y may range from approximately 5 μm to 20 μm. If the width $W_{212}$ of the pattern of recesses 212 is less than 5 μm, a first low-refractive area AG1 to be described later cannot be formed, thereby significantly lowering the efficiency of concentrating light. Further, haze may be increased as light is diffused by the pattern of recesses 212, such that the luminance may be lowered. If the width $W_{212}$ of the pattern of recesses 212 is greater than 20 μm, the effective optical interface for concentrating light cannot be formed sufficiently, such that the efficiency of concentrating light may be significantly lowered. In addition, the pattern of recesses 212 cannot sufficiently diffuse the light, such that the haze is lowered and the pattern may be seen from the outside.

The second support layer 120 may be disposed on the first optical functional layer 210. The second support layer 120 supports the second optical functional layer 310 thereon and enhances the rigidity of the composite optical sheet 11. Similar to the first support layer 110, the second support layer 120 may be made of a light-transmitting material. In some embodiments, the second support layer 120 may have an in-plane refractive index anisotropy. The thickness $t_{120}$ of the second support layer 120 may range from approximately 40 μm to 60 μm.

The maximum thickness $t_{210}$ of the first optical functional layer 210 may be smaller than the thickness $t_{110}$ of the first support layer 110 and the thickness $t_{120}$ of the second support layer 120. For example, the maximum thickness $t_{210}$ of the first optical functional layer 210 may be approximately 20 μm to 30 μm. The maximum thickness $t_{210}$ of the first optical functional layer 210 refers to the shortest vertical distance from the surface (upper surface in the drawings) of the first support layer 110 in contact with the first optical functional layer 210 to the reference plane 211.

The first adhesive layer 410 may be disposed between the first optical functional layer 210 and the second support layer 120. The first adhesive layer 410 may be disposed directly on a surface (lower surface in the drawings) of the second support layer 120. The first adhesive layer 410 may attach the first optical functional layer 210 to the second support layer 120. The first adhesive layer 410 may be a tacky layer or a bonding layer. The maximum thickness $t_{410}$ of the first adhesive layer 410 may range from approximately 5 μm to 10 μm. A sufficient adhesive force with the first optical functional layer 210 can be obtained when the maximum thickness $t_{410}$ of the first adhesive layer 410 is 5 μm or greater. If the maximum thickness $t_{410}$ of the first adhesive layer 410 is 10 μm or smaller, the first low refractive area AG1 to be described later can be formed. By doing so, the efficiency of concentrating light by the first optical functional layer 210 can be increased, so that the luminance improvement can be achieved.

In an exemplary embodiment, the first optical functional layer 210 may be coupled with the first adhesive layer 410 by penetrating into the first adhesive layer 410 at least partially. For example, the reference plane 211 of the first optical functional layer 210 may penetrate into the first adhesive layer 410, and at least a portion of the inner surface of the pattern of recesses 212 may penetrate into the first adhesive layer 410. That is, the first adhesive layer 410 may be used to fill at least a part of the pattern of recesses 212. By doing so, a space surrounded by the inner surface of the pattern of recesses 212 and the first adhesive layer 410 may form the first low refractive area AG1. The first low refractive area AG1 may be filled with air. The refractive index of the first low refractive area AG1 may be lower than that of each of the first optical functional layer 210, the first adhesive layer 410, and the second support layer 120.

In some embodiments, the reference plane 211 of the first optical functional layer 210 may be spaced apart from the second support layer 120. That is, the first adhesive layer 410 may be disposed between the reference plane 211 of the first optical functional layer 210 and the second support layer 120. The first optical functional layer 210 that is disposed to be spaced apart from the second support layer 120 can prevent the pattern of recesses 212 of the first optical function layer 210 or a stain from being seen from the outside.

The second optical functional layer 310 may be disposed on the second support layer 120. The second optical functional layer 310 serves to concentrate the light incident from below the composite optical sheet 11 secondly. That is, the second optical functional layer 310 may be a light-concentrating layer that concentrates at least a part of light incident from below the composite optical sheet 11. Although the second optical functional layer 310 shown in FIG. 1 is a prism pattern layer including a plurality of prisms 311, the second optical functional layer 310 may include a micro lens pattern and/or a lenticular lens pattern in other exemplary embodiments. The second optical functional layer 310 may be made of a photo-curable resin.

In an exemplary embodiment, the second optical functional layer 310 may include a pattern of prisms 311 arranged in the first direction X and a buffer 312 having a predetermined thickness. The pattern of prisms 311 and the buffer 312 may be formed integrally without being physically divided.

The pattern of prisms 311 may be arranged in the first direction X and repeated in the second direction Y. When the second support layer 120 has a rectangular shape when viewed from the top, the first direction X, in which the pattern of prisms 311 is extended, may be substantially parallel to the longer sides or the shorter sides of the second support layer 120.

In the cross-sectional view along the second direction Y, the pattern of prisms 311 may have a substantially triangular shape. For example, each of the prisms of the pattern of prisms 311 has two inclined faces 311s. The two inclined faces 311s may define an apex 311t of a prism. The angle of the apex 311t may be, but is not limited to, approximately 90°. The two inclined faces 311s may refract the transmitted light to change an optical path.

A valley 311v of the pattern of prisms 311 may be defined between every two prisms adjacent to each other in the second direction Y. The valley 311v of the pattern of prisms 311 refers to the lowest portion of the optical interface formed by the pattern of prisms 311. The vertically shortest distance from the level of the valley 311v to the level of the apex 311t of the pattern of prisms 311 is defined as the height $H_{311}$ of the pattern of prisms 311. The height $H_{311}$ of the pattern of prisms 311 may be approximately 25 μm to 35 μm. The peak-to-peak or valley-to-valley distance is defined as the pitch $P_{311}$ of the pattern of prisms 311. The pitch $P_{311}$ of the pattern of prisms 311 may be approximately 50 μm to 70 μm. If the pitch $P_{311}$ of the pattern of prisms 311 is 50 μm or greater, a second low refractive area AG2 to be described later can be formed. By doing so, the efficiency of concentrating light by the second optical functional layer 310 can be increased, so that the luminance improvement can be achieved. In addition, if the pitch $P_{311}$ of the pattern of prisms 311 is 70 μm or smaller, the pattern of prisms 311 or a stain may not be seen from the outside.

The buffer 312 may connect the pattern of prisms 311 to one another to reduce a deformation in the patterns caused by an external impact. The thickness $t_{312}$ of the buffer 312 may be, but is not limited to, approximately 3 to 5 μm.

A third support layer 130 may be disposed on the second optical function layer 310. The third support layer 130 supports the polarizing layer 500 thereon and enhances the rigidity of the composite optical sheet 11. Similar to the first support layer 110 and the second support layer 120, the third support layer 120 may be made of a light-transmitting material. In some embodiments, the third support layer 130 may have an in-plane refractive index anisotropy. The thickness $t_{130}$ of the third support layer 130 may range from approximately 40 μm to 60 μm. In an exemplary embodiment, the slow axis direction of the first support layer 110, the slow axis direction of the second support layer 120, and the slow axis direction of the third support layer 130 may be substantially parallel to one another. As used herein, a "slow axis" refers to an optical axis having the highest refractive index in an in-plane direction. By aligning the slow axes of the first support layer 110, the second support layer 120, and the third support layer 130 with one another, the efficiency of modulating light by the composite optical sheet 11 can be improved. As a non-limiting example, a layer having polarization characteristics, or a polarization layer, may not be disposed between the first support layer 110 and the second support layer 120, and between the second support layer 120 and the third support layer 130.

A second adhesive layer 420 may be disposed between the second optical functional layer 310 and the third support layer 130. The second adhesive layer 420 may be disposed directly on a surface (lower surface in the drawings) of the third support layer 130. The second adhesive layer 420 may attach the second optical function layer 310 to the third support layer 130. Similar to the first adhesive layer 410, the second adhesive layer 420 may be a tacky layer or a bonding layer. The maximum thickness $t_{420}$ of the second adhesive layer 420 may range from approximately 5 μm to 10 μm. A sufficient adhesive force with the second optical functional layer 310 can be obtained when the maximum thickness $t_{420}$ of the second adhesive layer 420 is 5 μm or greater. If the maximum thickness $t_{420}$ of the second adhesive layer 420 is 10 μm or smaller, the second low refractive area AG2 to be described later can be formed. By doing so, the efficiency of concentrating light by the second optical functional layer 310 can be increased, so that the luminance improvement can be achieved.

In an exemplary embodiment, the second optical functional layer 310 may be coupled with the second adhesive layer 420 by penetrating into the second adhesive layer 420 at least partially. For example, when the second optical functional layer 310 includes the pattern of prisms 311, the apex 311t of each of the prisms may penetrate into the second adhesive layer 420, and at least a portion of the inclined surfaces of each of the prisms may penetrate into the second adhesive layer 420. By doing so, a space surrounded by adjacent prisms of the pattern of prisms 311 and the second adhesive layer 420 may form the second low refractive area AG2. The second low refractive area AG2 may be filled with air. The refractive index of the second low refractive area AG2 may be lower than that of each of the second optical functional layer 310, the second adhesive layer 420, and the third support layer 130. In some embodiments, the apex 311t of each of the prisms of the pattern of prisms 311 of the second optical functional layer 310 may be spaced apart from the third support layer 130.

The polarizing layer 500 may be disposed on the third support layer 130. The polarizing layer 500 may selectively transmit components of the incident light that are polarized in parallel to a transmission axis of the polarizing layer 500 to impart a polarization state to the transmitted light. In an exemplary embodiment, the polarizing layer 500 may be a reflective polarizing layer that transmits components polarized in parallel to the transmission axis and reflects components polarized in parallel to a reflection axis. As a non-limiting example, the transmission axis or the reflection axis of the polarizing layer 500 may be substantially parallel to the first direction X in which the pattern of prisms 311 is extended.

The polarizing layer 500 may include a plurality of first refractive layers 501 and a plurality of second refractive layers 502 that are alternately stacked on one another. The refractive indices of the first refractive layers 501 and the second refractive layers 502 are substantially equal to each other in a certain direction in a plane whereas they are different from each other in another direction in the plane. For example, the first refractive layers 501 may be a layer including a uniaxially stretched polyethylene naphthalate (PEN) resin, and the second refractive layers 502 may be a layer including a copolymerized polyethylene naphthalate (coPEN) resin. The first refractive layer 501 or the second refractive layer 502 may be exposed via a surface (upper surface in the drawings) of the polarizing layer 500.

A third adhesive layer 430 may be disposed between the third support layer 130 and the polarizing layer 500. The third adhesive layer 430 may contact with the third support layer 130 and the polarizing layer 500 to attach them together. Similar to the first adhesive layer 410, the third adhesive layer 430 may be a tacky layer or a bonding layer. The thickness of the third adhesive layer 430 may be, but is not limited to, approximately 5 μm to 10 μm.

The composite optical sheet 11 according to the exemplary embodiment may integrally combine the first optical functional layer 210 that concentrates light firstly, the second optical functional layer 310 that concentrates light secondly, and the polarizing layer 500. The composite optical sheet 11 physically combined by the first adhesive layer 410 and the second adhesive layer 420 can modulate a variety of lights more precisely, and can have a sufficient rigidity to prevent the composite optical sheet 11 from being warped or wrinkled.

For example, the first optical functional layer 210 and the second optical functional layer 310 may be coupled with the first adhesive layer 410 and the second adhesive layer 420, respectively, by penetrating at least partially into the first adhesive layer 410 and the second adhesive layer 420, thereby improving a coupling stability without compromising the efficiency of modulating light. In addition, the composite optical sheet 11 is formed integrally without separating each individual sheet, such that unnecessary elements can be eliminated, thereby reducing the overall thickness of the composite optical sheet 11. In addition, by forming the composite optical sheet integrally instead of stacking individual optical sheets one by one with a spacing therebetween, the composite optical sheet 11 can have a relatively small thickness while having a sufficient rigidity and durability to prevent from being warped or wrinkled.

In some embodiments, the composite optical sheet 11 may further include the first bead coating layer 610 disposed on the lower surface of the first support layer 110, and the second bead coating layer 620 disposed on the upper surface of the polarizing layer 500.

The first bead coating layer 610 may provide a predetermined roughness to the lower surface of the first support layer 110. The first bead coating layer 610 can provide a predetermined distance between the composite optical sheet 11 and underlying components (not shown), thereby preventing the pattern or a stain from being seen from the outside.

The first bead coating layer 610 may include a plurality of first beads 611 having various sizes, and a first binder resin 612 surrounding the plurality of first beads 611. The first beads 611 may be disposed on the other surface (upper surface) of the first support layer 110 to provide a roughness thereon. The first beads 611 may be made of a material having a predetermined elasticity. For example, the first beads 611 may include a nylon resin or a urethane resin. The particle size of the plurality of first beads 611 may be approximately between 5 μm and 20 μm.

The second bead coating layer 620 may provide a predetermined roughness to the upper surface of the polarizing layer 500. The second bead coating layer 620 may protect the polarizing layer 500 from a physical impact or damage and may diffuse light to provide haze. In addition, the second bead coating layer 620 may provide a predetermined distance between the composite optical sheet 11 and overlying components (not shown), thereby preventing the pattern or a stain from being seen from the outside.

The second bead coating layer 620 may include a plurality of second beads 621 having different sizes, and a second binder resin 622 surrounding the plurality of first beads 622. The second beads 621 may be disposed on the other surface (lower surface) of the polarizing layer 500 to provide a roughness thereon. The second beads 621 may be made of a material having a predetermined elasticity. For example, the second beads 621 may include a polymethyl methacrylate (PMMA) resin, a polybutyl methacrylate (PBMA) resin, a nylon resin, or a urethane resin. In some embodiments, the elasticity of the second beads 621 may be, but is not limited to being, less than the elasticity of the first beads 611. The particle size of the plurality of second beads 621 may be approximately between 5 μm to 15 μm.

The number of the first beads 611 per unit area of the first bead coating layer 610 may be smaller than the number of the second beads 621 per unit area of the second bead coating layer 620. That is, the density of the first beads 611 may be smaller than the density of the second beads 621. By making the number of the first beads 611 in the first bead coating layer 610 smaller than the number of the second beads 621 in the second bead coating layer 620, scattering or diffusion of the light incident from below the composite optical sheet 11 is reduced, such that the light is transmitted toward the first optical functional layer 210. In addition, by making the number of the second beads 621 in the second bead coating layer 620 larger than the number of the first beads 611 in the first bead coating layer 610, the light modulated by the first optical functional layer 210 and the second optical functional layer 310 can be at least partially diffused.

The first binder resin 612 may surround the plurality of first beads 611, and the second binder resin 622 may surround the plurality of second beads 621. The first binder resin 612 and the second binder resin 622 may be made of a thermosetting resin. The first binder resin 612 and the second binder resin 622 may fix the plurality of first beads 611 and the plurality of second beads 621, respectively.

In an exemplary embodiment, the average width $W_{212}$ in the second direction Y of the pattern of recesses 212 of the first optical functional layer 210 may be greater than the average particle size of the second beads 621 of the second bead coating layer 620. The relationship between the sizes, for example, the average width $W_{212}$ of the pattern of recesses 212 disposed below the polarizing layer 500 to allow the first optical functional layer 210 to concentrate light and the average particle size of the second beads 621 in the second bead coating layer 620 disposed above the polarizing layer 500 may affect the optical modulation characteristics of the composite optical sheet 11. For example, if the average particle size of the second beads 621 is larger than the average width $W_{212}$ of the pattern of recesses 212, the efficiency of diffusing the light having passed through the first optical function layer 210 by the second bead coating layer 620 may be lowered. Further, when the composite optical sheet 11 is employed by a display device, sparkling may occur.

The pitch $P_{311}$ of the pattern of prisms 311 of the second optical functional layer 310 may be approximately three to seven times the average particle size of the second beads 621 of the second bead coating layer 620. That is, the average particle size of the second beads 621 may be one-seventh to one-third of the pitch $P_{311}$ of the pattern of prisms 311. The relationship between the sizes, for example, the pitch $P_{311}$ of the pattern of prisms 311 disposed below the polarizing layer 500 and the average particle size of the second beads 621 in the second bead coating layer 620 disposed above the polarizing layer 500 may affect the optical modulation characteristics of the composite optical sheet 11. For example, if the average particle size of the second beads 621 is smaller than the pitch $P_{311}$ of the pattern of prisms 311, the polarized light having passed through the polarizing layer 500 can be canceled, such that haze can be increased to lower the luminance. On the other hand, if the average particle size of the second beads 621 is larger than the pitch $P_{311}$ of the pattern of prisms 311, sparkling may occur when the composite optical sheet 11 is employed by a display device.

Figure 6:
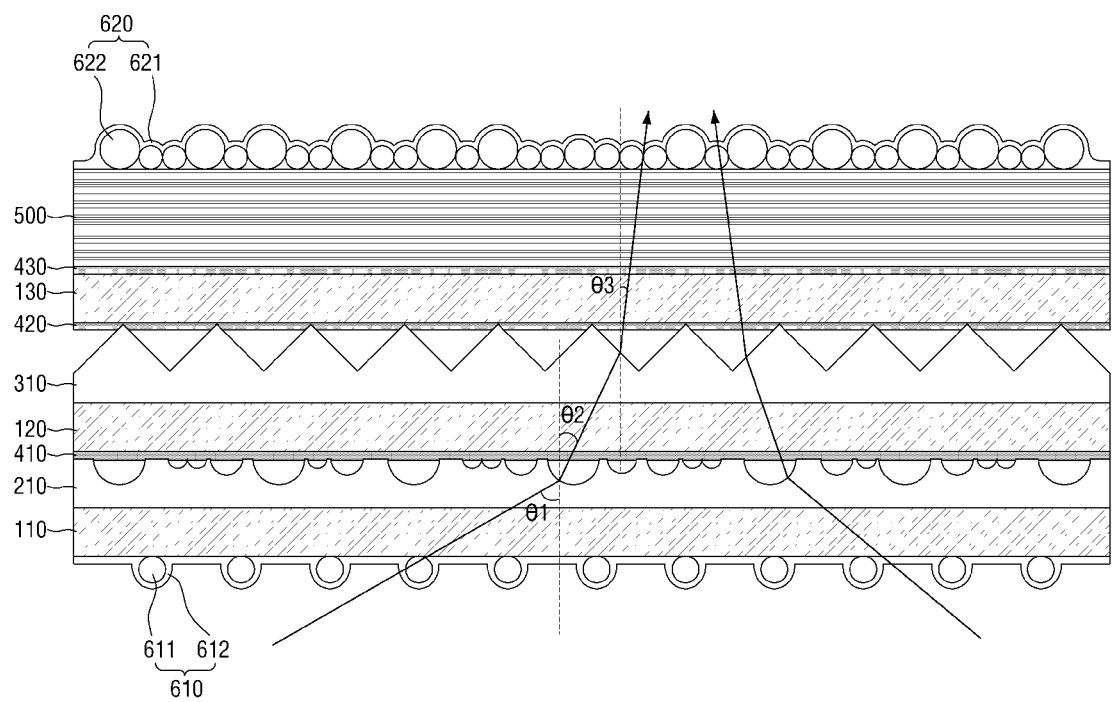
FIG. 6 is a view for illustrating a path in which light transmitting the composite optical sheet of FIG. 1 travels.

Hereinafter, the efficiency of modulating light by the composite optical sheet 11 according to the exemplary embodiment will be described in detail with reference to FIG. 6. FIG. 6 is a view for illustrating a path in which light transmitting the composite optical sheet 11 of FIG. 1 travels.

Referring to FIGS. 1 to 6, the light incident from below the composite optical sheet 11 may have a relatively large incident angle. That is, the light incident on the composite optical sheet 11 may be inclined. As used herein, the terms "incident angle" and "exit angle" refer to the angles between the normal to the plane where the incident point belongs and the optical path.

For example, a first incident angle θ1 of light incident on the first optical functional layer 210, but is not limited to, approximately 60° to 70°. The pattern of recesses 212 of the first optical functional layer 210 may concentrate light firstly. The light incident on an optical interface between the pattern of recesses 212 and the first low refractive area AG1 may exit the optical interface having its optical path changed. In this case, the first exit angle θ2 of the light modulated by the first optical functional layer 210 may be smaller than the first incident angle θ1.

In addition, the second incident angle of the light incident on the second optical functional layer 310 may be substantially equal to that of the first exit angle θ2. The pattern of prisms 311 of the second optical functional layer 310 may concentrate light secondly. The light incident on an optical interface between the pattern of prisms 311 and the second low refractive area AG2 may exit the optical interface having its optical path changed. In this case, the second exit angle θ3 of the light modulated by the second optical functional layer 310 may be smaller than the second incident angle, i.e., the first exit angle θ2. In this manner, the light having passed through the composite optical sheet 11 may exit at an angle close to the normal of the composite optical sheet 11 in a direction parallel to the third direction Z. When employed by a display device, the composite optical sheet 11 can enhance luminance of the display device.

Although not shown in the drawings, the components of the light incident on the polarization layer 500 in parallel to the transmission axis of the polarization layer 500 may transmit the polarization layer 500, whereas the components of the light after having passed through the polarization layer 500 in parallel to the reflection axis of the polarization layer 500 may be reflected by the polarization layer 500.

Hereinafter, other exemplary embodiments will be described. The description on substantially the same elements as the composite optical sheet according to the above-described embodiment may be omitted, which will be clearly understood by those skilled in the art from the accompanying drawings. In the drawings, like reference numerals designate like elements.

Figure 7:
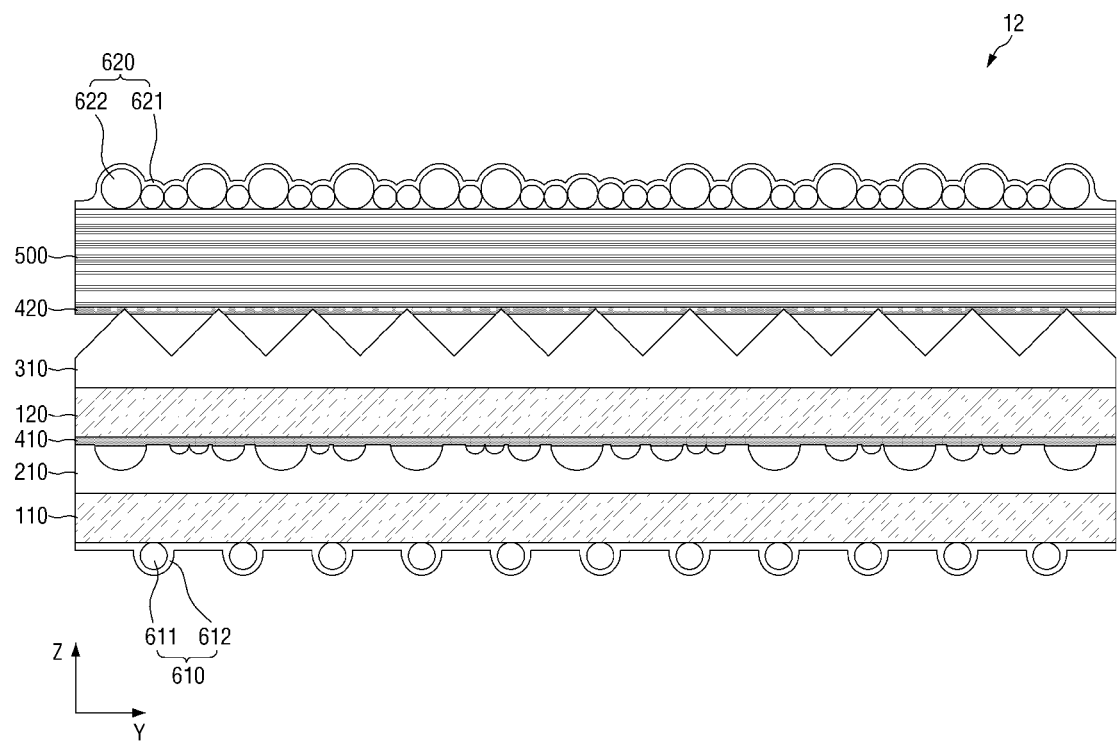
FIG. 7 is a cross-sectional view of a composite optical sheet according to another exemplary embodiment.

FIG. 7 is a cross-sectional view of a composite optical sheet according to another exemplary embodiment.

Referring to FIG. 7, the composite optical sheet 12 according to the exemplary embodiment is different from the composite optical sheet 11 according to the exemplary embodiment shown in FIG. 1 in that the composite optical sheet 12 does not include the third support layer 130 and the third adhesive layer 430.

In an exemplary embodiment, the second adhesive layer 420 may be disposed directly on the lower surface of the polarizing layer 500. The second adhesive layer 420 may attach the second optical functional layer 310 to the polarizing layer 500. In addition, the second optical functional layer 310 may be coupled with the second adhesive layer 420 by penetrating into the second adhesive layer 420 at least partially. In some embodiments, the apexes 311t of the pattern of prisms 311 of the second optical functional layer 310 may be spaced apart from the polarizing layer 500.

Figure 8:
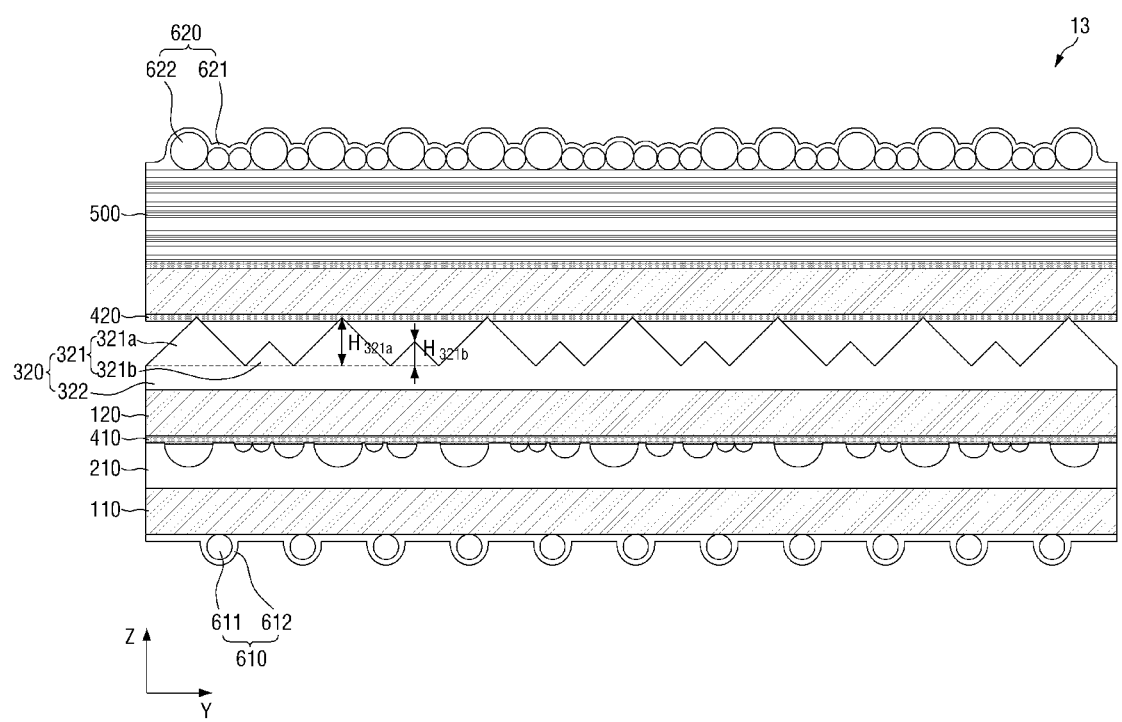
FIGS. 8 to 18 are view showing composite optical sheets according to other exemplary embodiments.

FIG. 8 is a cross-sectional view of a composite optical sheet according to yet another exemplary embodiment.

Referring to FIG. 8, the composite optical sheet 13 according to the exemplary embodiment is different from the composite optical sheet 11 according to the exemplary embodiment shown in FIG. 1 in that the composite optical sheet 13 includes a second optical functional layer 320 having patterns of prisms 321 of different heights and/or width.

In an exemplary embodiment, the second optical functional layer 320 may include patterns of prisms 321 extended in the first direction X and a buffer 322 having a predetermined thickness. The patterns of prisms 321 and the buffer 322 may be formed integrally without being physically divided.

The plurality of patterns of prisms 321 may include a first pattern of prisms 321a that has a first height $H_{321a}$, and a second pattern of prisms 321b that has a second height $H_{321b}$ that is smaller than the first height $H_{321a}$ and is adjacent to the first pattern of prisms 321a. One prism of the first pattern of prisms 321a and one prism of the second pattern of prisms 321b, as a unit, may be repeatedly arranged in the second direction Y. Although FIG. 8 illustrates that one prism of the first pattern of prisms 321a and one prisms of the second pattern of prisms 321b are repeatedly arranged as a unit, this is merely illustrative. For example, a plurality of prisms of the first pattern of prisms 321a and one prism of the second pattern of prisms 321b may be repeatedly arranged as a unit, one prism of the first pattern of prisms 321a and a plurality of prisms of the second pattern of prisms 321b may be repeatedly arranged as a unit, and/or a plurality of prisms of the first pattern of prisms 321a and a plurality of prisms of the second pattern of prisms 321b may be repeatedly arranged as a unit.

In the cross-sectional view of taken along the second direction Y, both of the first pattern of prisms 321a and the second pattern of prisms 321b may have a substantially triangular shape. The first height $H_{321a}$ of the first pattern of prisms 321a may be approximately 65 μm to 70 μm, and the second height $H_{321b}$ of the second pattern of prisms 321b may be approximately 50 μm to 60 μm.

In an exemplary embodiment, the first pattern of prisms 321a of the second optical functional layer 320 may be coupled with the second adhesive layer 420 by penetrating into the second adhesive layer 420 at least partially, whereas the second pattern of prisms 321b may not penetrate into the second adhesive layer 420 and may be spaced apart from the second adhesive layer 420. By doing so, a space surrounded by two prisms of the first pattern of prisms 321a and the second adhesive layer 420 may form a second low refractive area. The optical interface formed by the second low refractive area and the inclined faces of the first pattern of prisms 321a and the second pattern of prisms 321b may concentrate light.

The second optical functional layer 320 according to the exemplary embodiment includes the first pattern of prisms 321a and the second pattern of prisms 321b having different heights and/or width, thereby enhancing the coupling stability and concentrating light more efficiently. There may be a trade-off between the coupling stability and the efficiency of concentrate light. For example, as the number of prisms of the patterns of prisms 321 that penetrate into the second adhesive layer 420 increases, the coupling stability is improved while the efficiency of concentrating light is lowered since the area of the optical interface decreases. For the composite optical sheet 13 according to the exemplary embodiment, the first pattern of prisms 321a having the relatively high first height $H_{321a}$ may be used to obtain a sufficient coupling force, while the optical interface not penetrating the second adhesive layer 420 may concentrate light. In particular, the second pattern of prisms 321b having the relatively low second height $H_{321b}$ is separated from the second adhesive layer 420, so that the second pattern of prisms 321b can be solely used to concentrate light.

Figure 9:
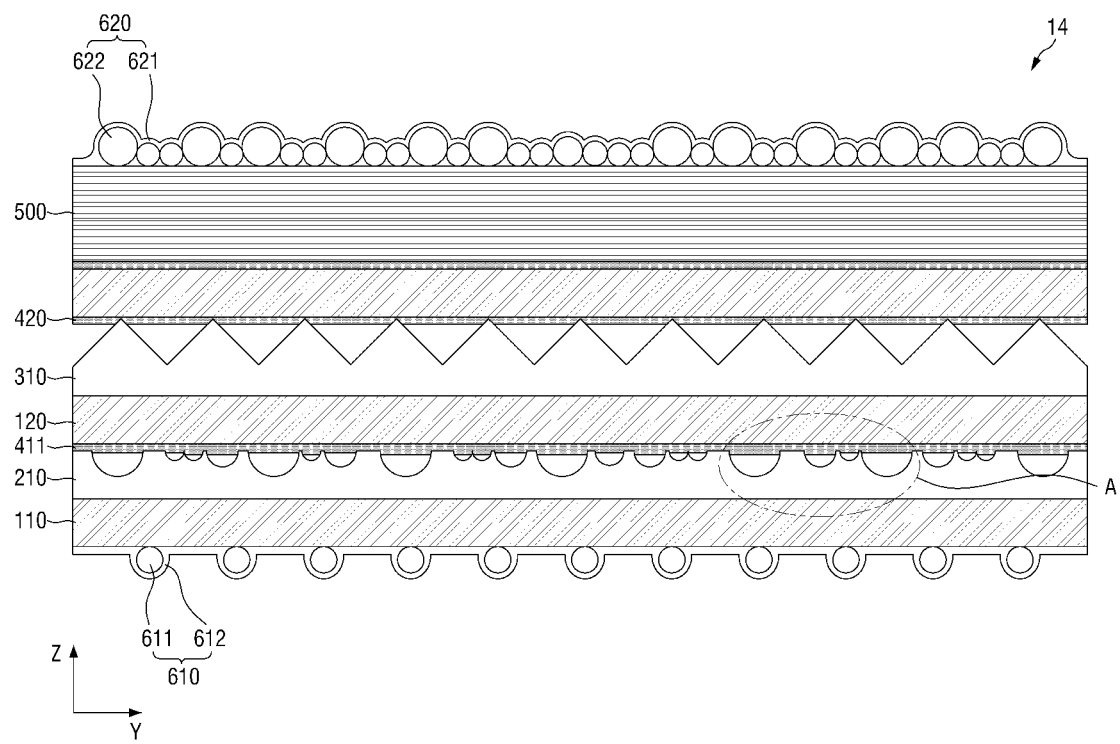
Figure 10:
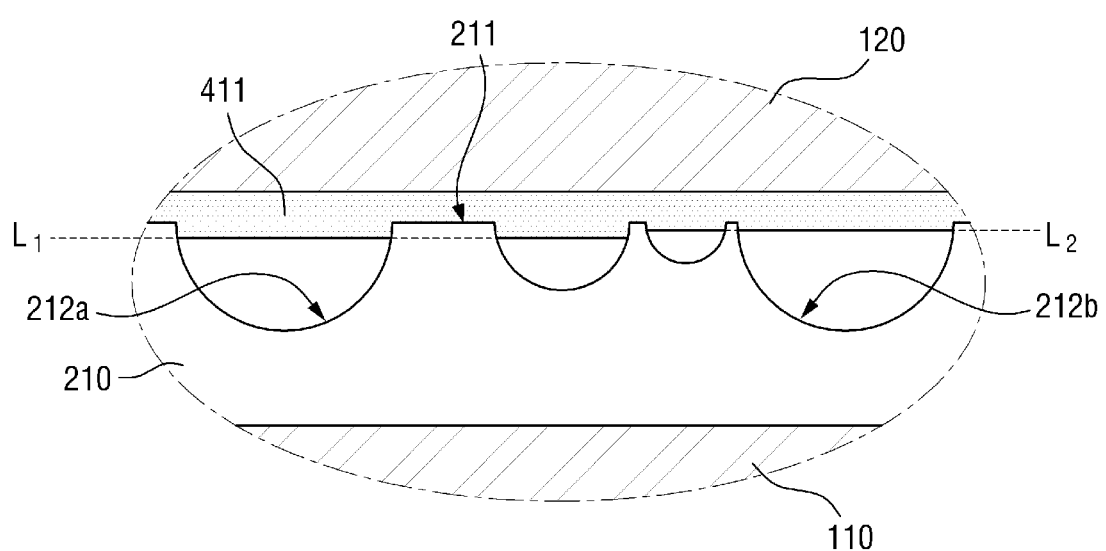

FIG. 9 is a cross-sectional view of a composite optical sheet according to yet another exemplary embodiment. FIG. 10 is an enlarged view of portion A of FIG. 9.

Referring to FIGS. 9 and 10, the composite optical sheet 14 according to the exemplary embodiment is different from the composite optical sheet 11 according to the exemplary embodiment shown in FIG. 1 in that the lower surface of a first adhesive layer 411 facing the first optical functional layer 210 has different levels.

In an exemplary embodiment, the first optical functional layer 210 may be coupled with the first adhesive layer 411 by penetrating into the first adhesive layer 411 at least partially. For example, a reference plane 211 of the first optical functional layer 210 may penetrate into the first adhesive layer 411. In addition, the first optical functional layer 210 includes a first pattern of recesses 212a and a second pattern of recesses 212b. At least a portion of the inner surface of the first pattern of recesses 212a may penetrate into the first adhesive layer 411, and at least a portion of the inner surface of the second pattern of recesses 212b may penetrate into the first adhesive layer 411.

That is, the first adhesive layer 411 may be used to fill at least a portion of the first pattern of recesses 212a to form a low refractive area therebetween. The first adhesive 411 may be used to fill at least a portion of the second pattern of recesses 212b to form another low refractive area therebetween. In this case, the level L1 of the lower surface of the first adhesive layer 411 used to fill the first pattern of recesses 212a may be different from the level L2 of the surface of the first adhesive layer 411 used to fill the second pattern of recesses 212b. For example, from the surface of the first support layer 110, the level L1 of the surface of the first adhesive layer 411 used to fill the first pattern of recesses 212a may be lower than the level L2 of the surface of the first adhesive layer 411 used to fill the second pattern of recesses 212b. The size of the first pattern of recesses 212a may be the same as or different from the size of the second pattern of recesses 212b.

The composite optical sheet 14 according to the exemplary embodiment of the present disclosure may diversify the upper level of the low refractive area defined between the first optical functional layer 210 and the first adhesive layer 411. That is, even when the sizes of the first pattern of recesses 212a and the second pattern of recesses 212b are the same, the volume of the space of the low refractive area forming the optical interface can be diversified. By doing so, the optical path in which light is concentrated by the first optical functional layer 210 can be diversified. Further, the efficiency of diffusing light by the first optical functional layer 210 can be further increased.

Figure 11:
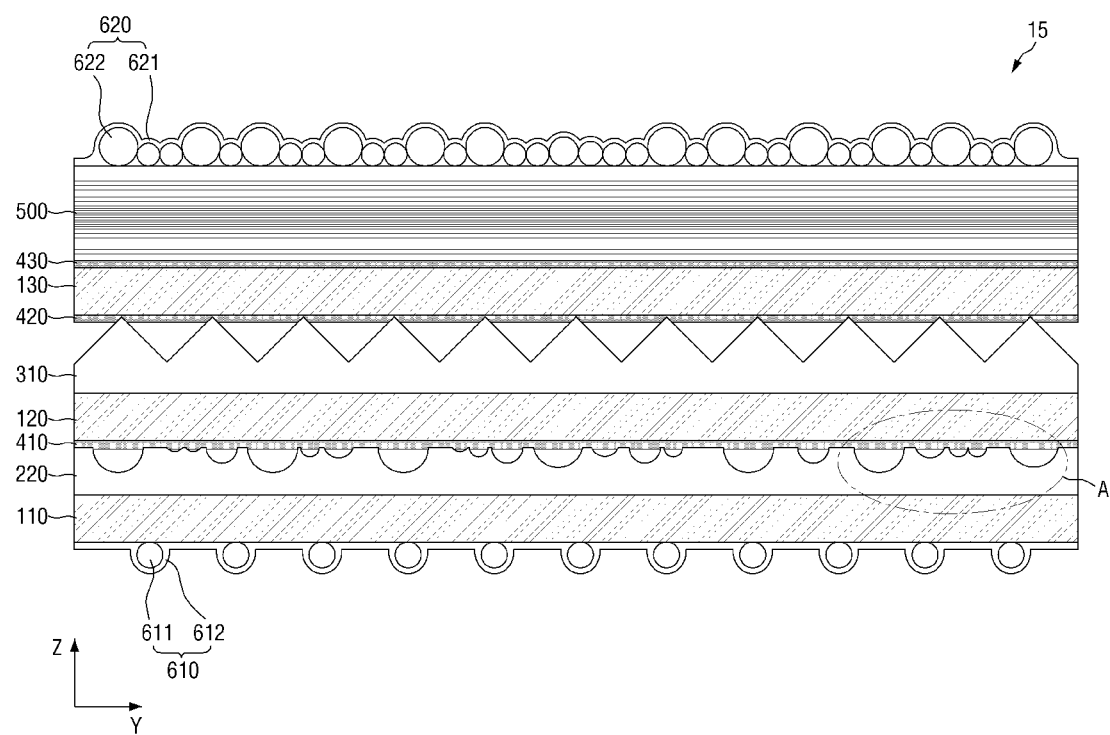
Figure 12:
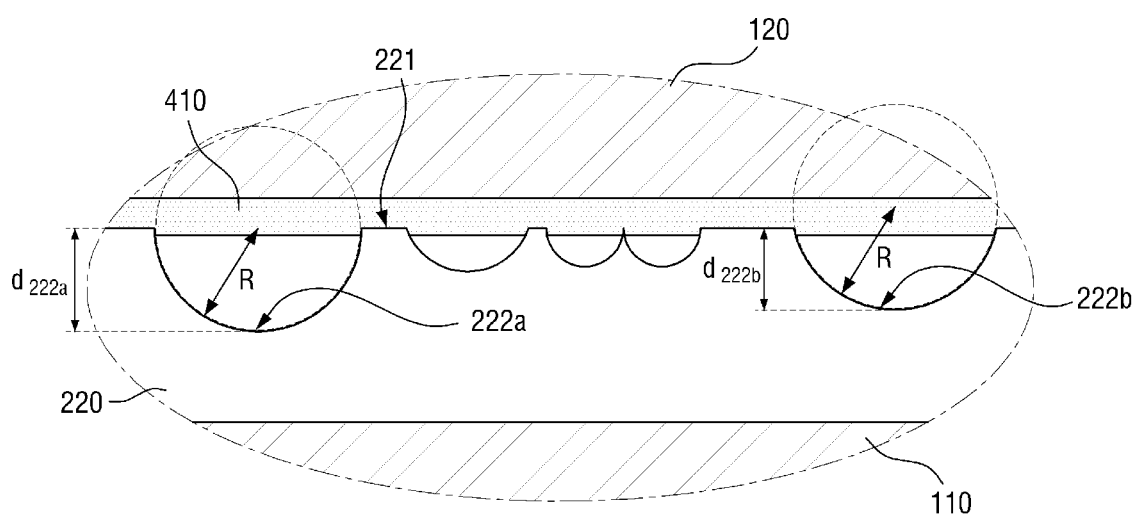

FIG. 11 is a cross-sectional view of a composite optical sheet according to yet another exemplary embodiment. FIG. 12 is an enlarged view of portion A of FIG. 11.

Referring to FIGS. 11 and 12, the composite optical sheet 15 according to the exemplary embodiment is different from the composite optical sheet 11 according to the exemplary embodiment shown in FIG. 1 in that the composite optical sheet 15 includes a plurality of patterns of recesses having different depths in a first optical functional layer 220.

In an exemplary embodiment, the upper surface of the first optical functional layer 220 may include a reference plane 221, and a plurality of patterns of recesses are dented inwardly of the reference plane 211.

The plurality of patterns of recesses may include a first pattern of recesses 222a having a first depth $d_{222a}$, and a second pattern of recesses 222b having a second depth $d_{222b}$ that is smaller than the first depth $d_{222a}$. The first adhesive layer 410 may be used to fill at least a portion of the first pattern of recesses 222a to form a low refractive area therebetween. The first adhesive 410 may be used to fill at least a portion of the second pattern of recesses 212b to form another low refractive area therebetween.

The cross section of both of the first pattern of recesses 222a and the second pattern of recesses 222b may be a part of an arc. In this case, both of the first pattern of recesses 222a and the second pattern of recesses 222b may be a part of an arc having the same curvature radius R. For example, the cross-section of the first pattern of recesses 222a may be approximately a half circle, and the cross-section of the second pattern of recesses 222b may be an arc having an angle of 180° or smaller.

The composite optical sheet 15 according to the exemplary embodiment of the present disclosure may diversify the volume of the space of the low refractive area defined between the first optical functional layer 220 and the first adhesive layer 410. By doing so, the optical path in which light is concentrated by the first optical functional layer 220 can be diversified. Further, the efficiency of diffusing light by the first optical functional layer 220 can be further increased.

Figure 13:
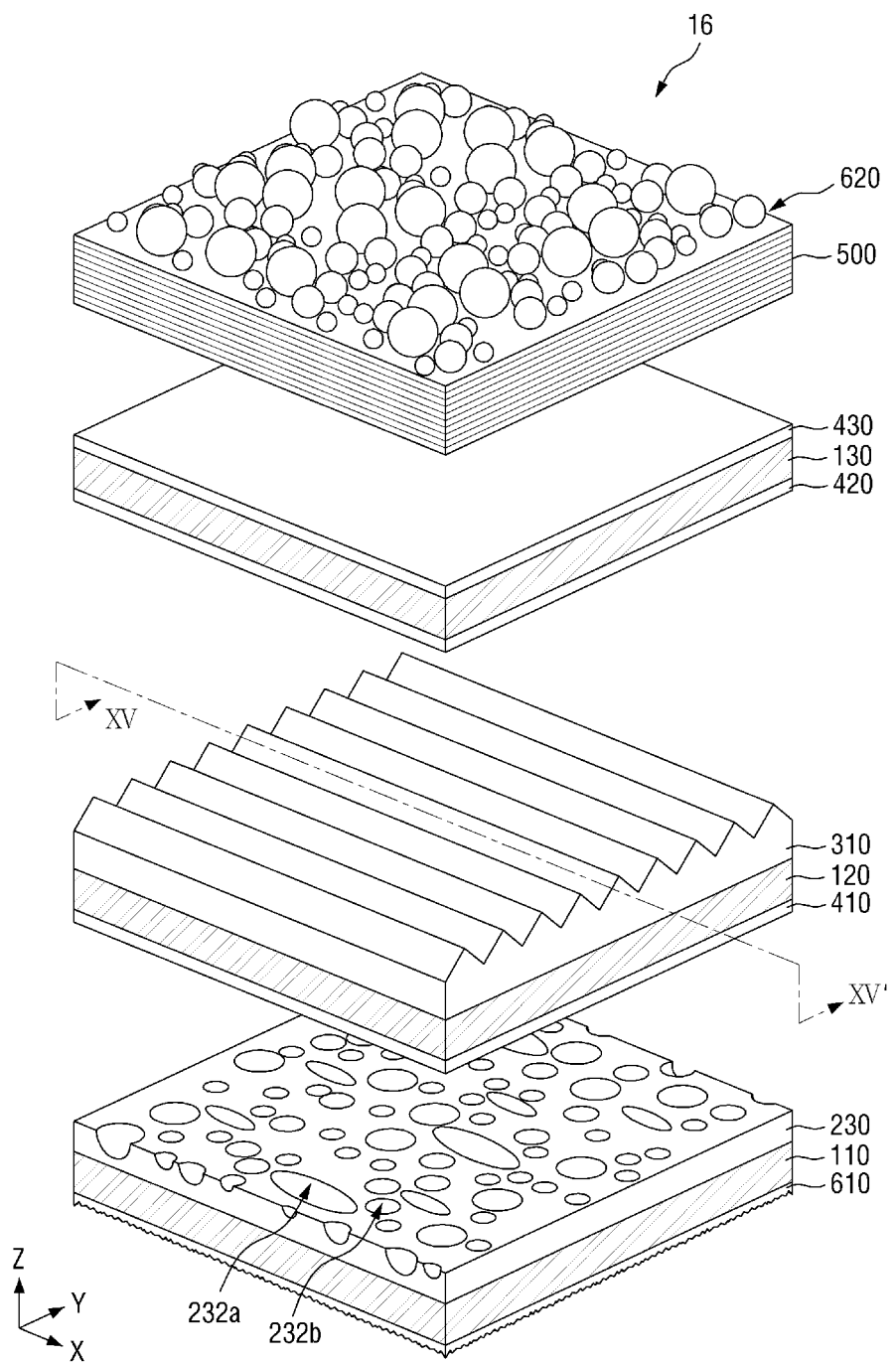
Figure 14:
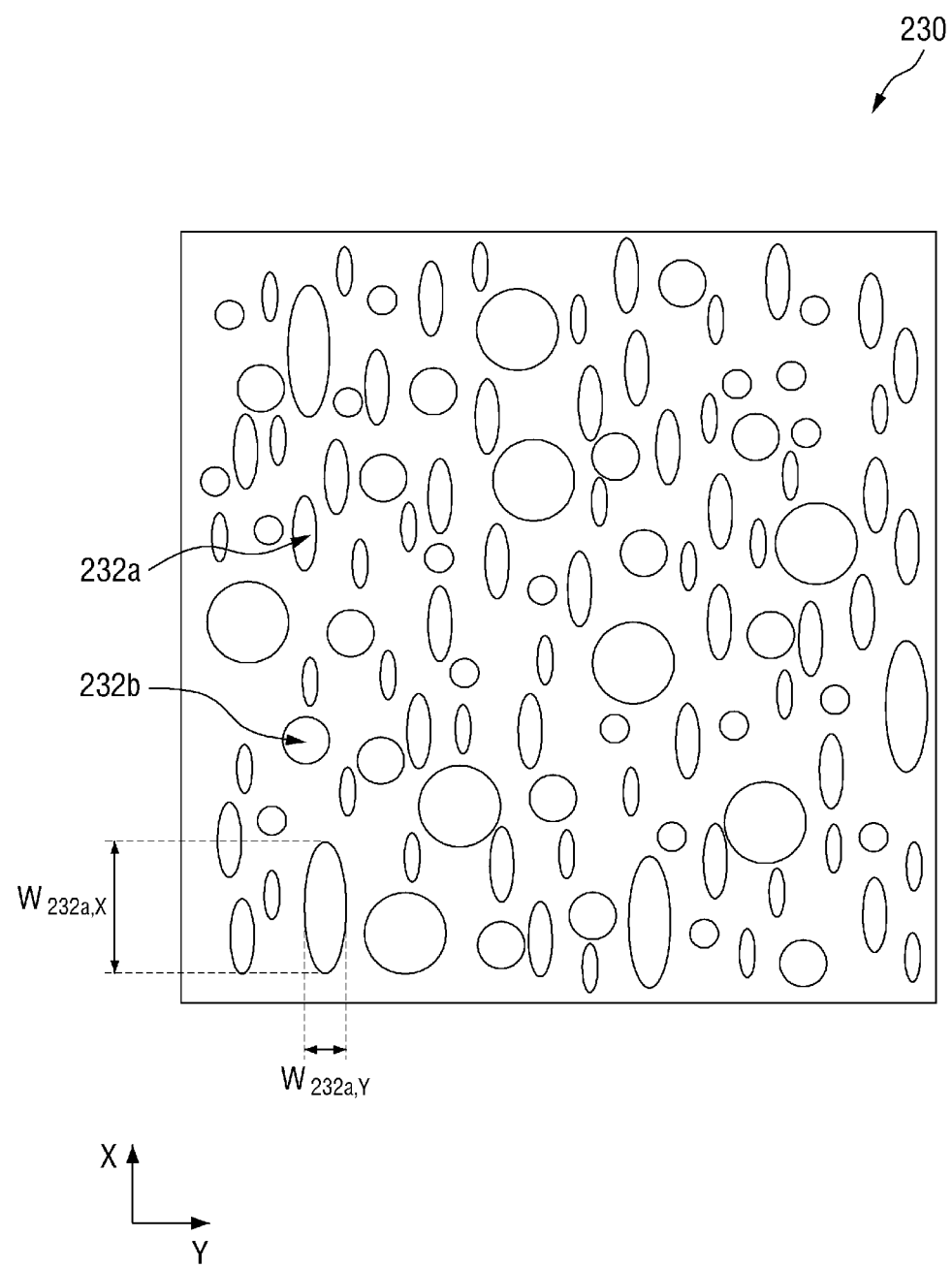
Figure 15:
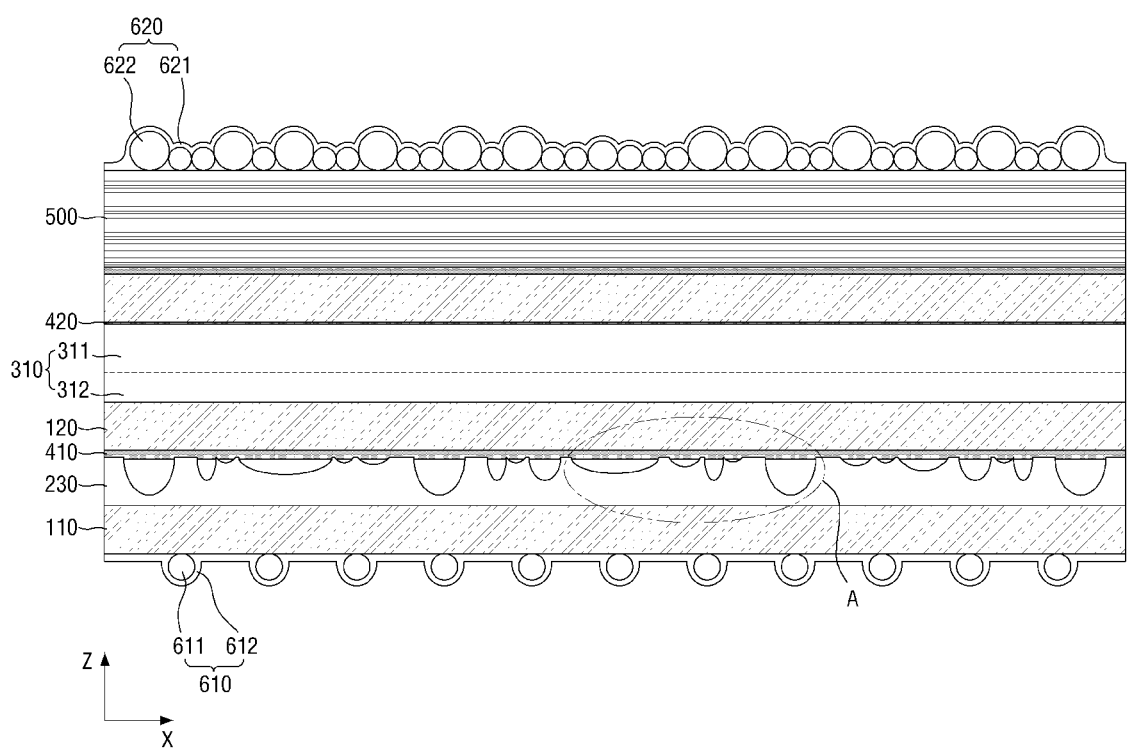
Figure 16:
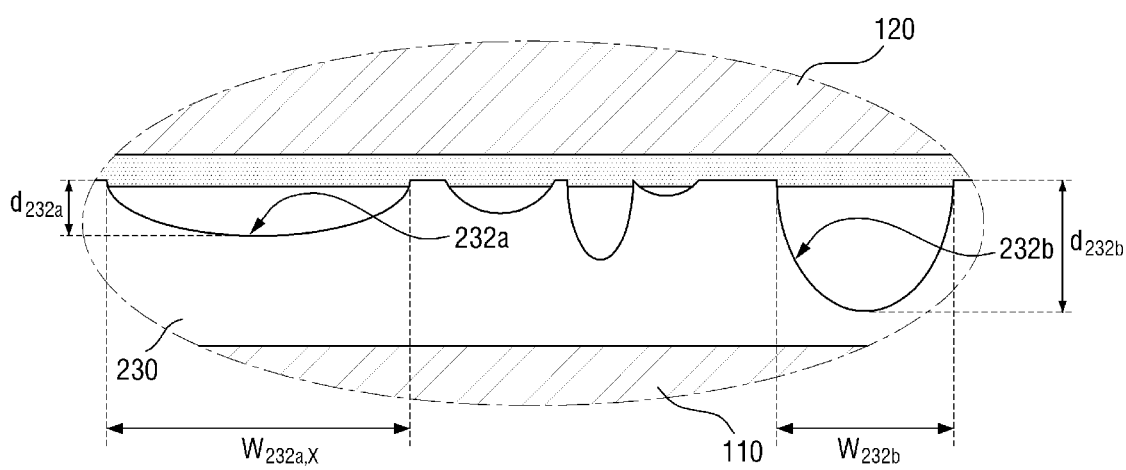

FIG. 13 is an exploded perspective view of a composite optical sheet according to yet another exemplary embodiment. FIG. 14 is a plan view of the first optical functional layer shown in FIG. 13. FIG. 15 is a cross-sectional view taken along line XV-XV' of FIG. 13. FIG. 16 is an enlarged view of portion A of FIG. 15.

Referring to FIGS. 13 to 16, the composite optical sheet 16 according to the exemplary embodiment is different from the composite optical sheet 11 according to the exemplary embodiment shown in FIG. 1 in that a first optical functional layer 230 includes a first pattern of recesses 232a in a substantially elliptical shape when viewed from the top, and a second pattern of recesses 232b in a substantially circular shape when viewed from the top.

In an exemplary embodiment, each recess of the first pattern of recesses 232a may have a width $W_{232a,X}$ in the first direction X that is greater than a width $W_{232a,Y}$ in a second direction Y when viewed from the top. In the cross-sectional view taken along the second direction Y, the cross section of each recess of the first pattern of recesses 232a may be a part of an arc. For example, the cross section of each recess of the first pattern of recesses 232a may be a substantially half circle. In this case, the light incident from one side in the second direction Y can be more efficiently concentrated by the first pattern of recesses 232a.

The direction in which the first pattern of recesses 232a are extended (i.e., the first direction X) may be substantially parallel to the direction in which the pattern of prisms 311 of the second optical function layer 310 is extended. Light is concentrated firstly by the first pattern of recesses 232a, and then secondly by the pattern of prisms, such that the luminance of the composite optical sheet 16 can be further improved. For example, when light is incident from one side in the second direction Y, the light scattering in the second direction Y can be efficiently concentrated.

The shape of each recess of the second pattern of recesses 232b may be a substantially circle. In the cross-sectional view taken along the second direction Y, the cross section of each recess of the second pattern 232b may be a part of an arc. For example, the cross section of each recess of the second pattern 232b may be a substantially half circle. In this case, the light incident at a large angle, i.e., the largely inclined light can be more efficiently concentrated by the second pattern of recesses 232b.

In addition, the width $W_{232a,X}$ in the first direction X of each recess of the first pattern of recesses 232a may be greater than the first depth $d_{232a}$ of each recess of the first pattern of recesses 232a. In addition, the width $W_{232b}$ in the first direction X of each recess of the second pattern of recesses 232b may be smaller than the second depth $d_{232b}$ of each recess of the second pattern of recesses 232b.

Figure 17:
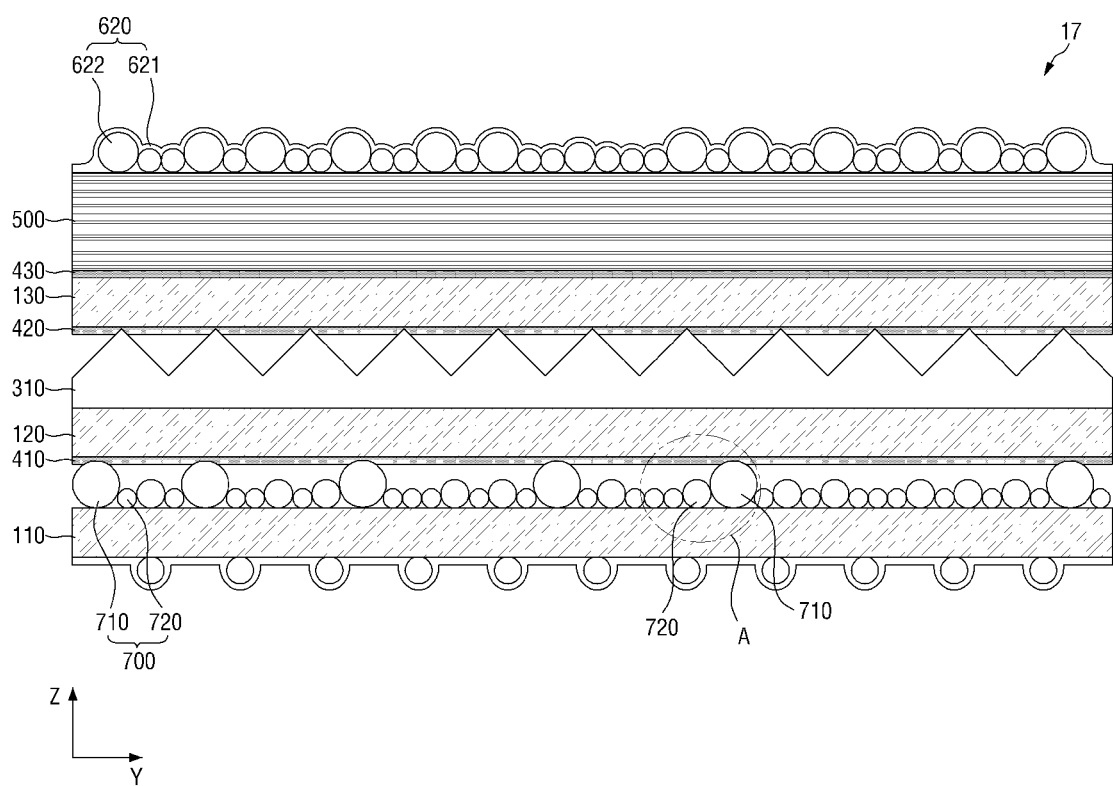
Figure 18:
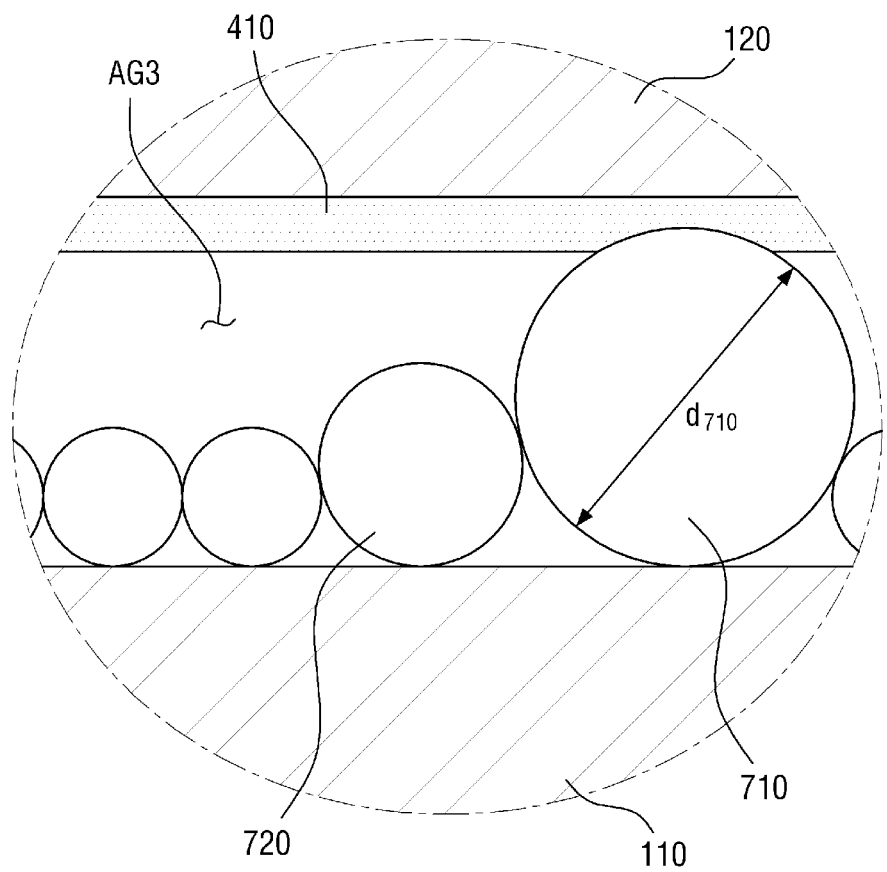

FIG. 17 is a cross-sectional view of a composite optical sheet according to yet another exemplary embodiment. FIG. 18 is an enlarged view of portion A of FIG. 17.

Referring to FIGS. 17 and 18, a composite optical sheet 17 according to the exemplary embodiment is different from the composite optical sheet 11 according to the exemplary embodiment shown in FIG. 1 in that the composite optical sheet 17 further includes a third bead coating layer 700 instead of the first optical functional layer 210.

In an exemplary embodiment, the third bead coating layer 700 may be disposed on the first support layer 110. The third bead coating layer 700 may concentrate light incident from below the composite optical sheet 17 firstly and may further diffuse the light.

The third bead coating layer 700 may include third beads 710 having a third particle size $d_{710}$, and fourth beads 720 having a fourth particle size $d_{720}$ that is smaller than the third particle size $d_{710}$. The third beads 710 and the fourth beads 720 may be made of the same material. For example, the third beads 710 and the fourth beads 720 may include a polymethyl methacrylate (PMMA) resin, a polybutyl methacrylate (PBMA) resin, a nylon resin, or a urethane resin. The third particle size $d_{710}$ of the third beads 710 may be approximately 20 μm or greater. The particle size $d_{720}$ of the fourth beads 720 may be approximately 5 μm to 15 μm.

A second support layer 120 may be disposed on the third bead coating layer 700. The first adhesive layer 410 may be disposed between the third bead coating layer 700 and the second support layer 120. The first adhesive layer 410 may attach the third bead coating layer 700 to the second support layer 120. For example, the third beads 710 of the third bead coating layer 700 may be coupled with the first adhesive layer 410 by penetrating into the first adhesive layer 410 at least partially. On the other hand, the fourth beads 720 may not penetrate into the first adhesive layer 410 and may be spaced apart from the first adhesive layer 410. By doing so, a third low refractive area AG3 may be formed between the third bead coating layer 700 and the first adhesive layer 410. The optical interface formed by the third low refractive area AG3 may concentrate light and/or diffuse light.

The third bead coating layer 700 according to the exemplary embodiment of the present disclosure includes the third beads 710 and the fourth beads 720 having different sizes, thereby enhancing the coupling stability and concentrating light more efficiently. For example, the third beads 710 having a relatively large particle size may be used to achieve a sufficient coupling force, while the fourth beads 720 having a relatively small particle size are separated from the first adhesive layer 410 to solely modulate light.

Hereinafter, a liquid-crystal display device according to an exemplary embodiment of the present disclosure will be described.

Figure 19:
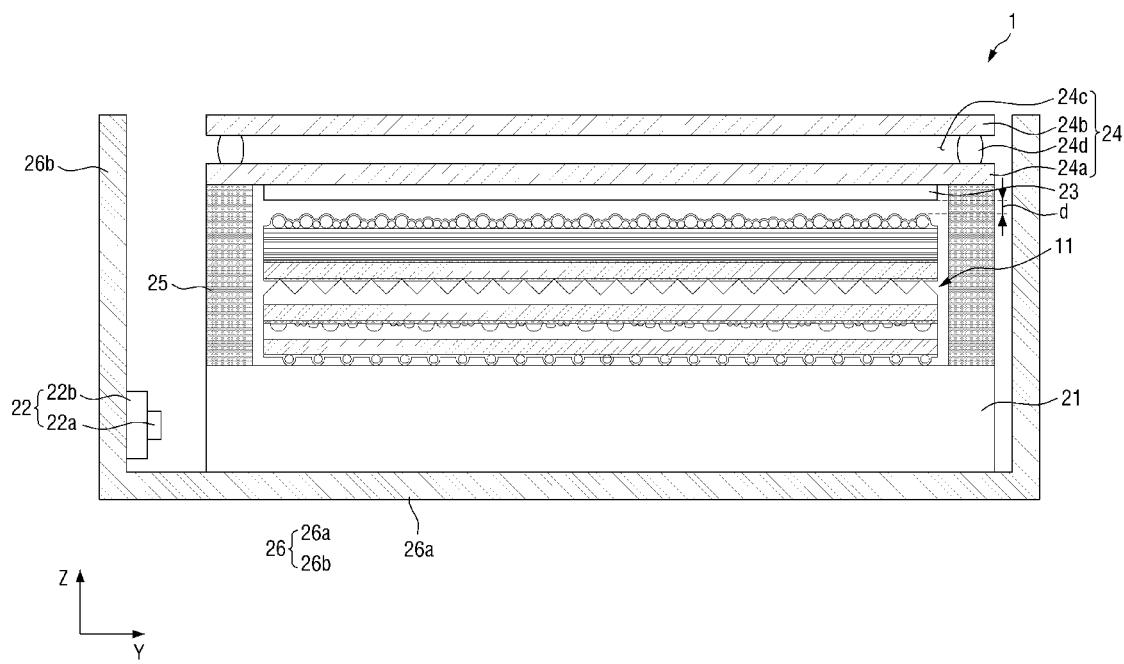
FIG. 19 is a cross-sectional view of a liquid-crystal display device according to an exemplary embodiment.

FIG. 19 is a cross-sectional view of a liquid-crystal display device according to an exemplary embodiment.

Referring to FIG. 19, the liquid-crystal display device 1 according to an exemplary embodiment may include a light guide plate 21, a light source unit 22 disposed on one side of the light guide plate 21 in the second direction Y, a composite optical sheet 11 disposed on the light guide plate 21, a second polarizing layer 23 disposed on the composite optical sheet 11, a liquid-crystal display panel 24 disposed on the second polarizing layer 23, a coupling member 25 for coupling the light guide plate 21 with the liquid-crystal display panel 24, and a housing 26 that accommodates the light guide plate 21, the light source unit 22, and the composite optical sheet 11.

The housing 26 may include a bottom portion 26a forming the bottom surface and side walls 26b having a substantially rectangular shape protruding upward from the edges of the bottom portion 26a, respectively. The housing 26 may have a substantially box shape to accommodate the light guide plate 21 and the composite optical sheet 11. The bottom portion 26a and the side walls 26b may be formed integrally without being physical divided.

The light guide plate 21 may be disposed on the bottom portion 26a of the housing 26. The light guide plate 21 may guide light provided from the light source unit 22 toward the liquid-crystal display panel 24. For example, the side surface of the light guide plate 21 closer to the light source unit 22 in the second direction Y may be the surface on which light is incident, while the upper surface of the light guide plate 21 that faces the liquid-crystal display panel 24 may be the surface via which the light exits. The light guide plate 21 may be made of a material having high light transmittance to guide light provided from the light source unit 22 without much light loss. Examples of the material of the light guide plate 21 may include, but are not limited to, plastic or glass.

The light source unit 22 may be disposed on one side of the light guide plate 21 in the second direction Y. The light source unit 22 may include a light source circuit board 22b for providing signals and power for driving a light source 22a, and the light source 22a is mounted on one surface of the light source circuit board 22b to directly emit light. Although not shown in the drawings, the light source circuit board 22b may be extended along a direction parallel to the direction in which the pattern of prisms of the second optical functional layer 310 (see FIG. 1) of the composite optical sheet 11 is extended. More than one light source 22a may be disposed on the light source circuit board 22b and spaced from one another along the direction in which the light source circuit board 22b is extended. The light source 22a may be a light-emitting diode. The light source 22a may emit white light, blue light, or light in the ultraviolet wavelength band.

The composite optical sheet 11 may be disposed on the light guide plate 21. The composite optical sheet 11 may be disposed directly on the light guide plate 21. The composite optical sheet 11 may overlap with the light guide plate 21 in the third direction Z. Although the liquid-crystal display device 1 shown in FIG. 19 employs the composite optical sheet 11 according to the embodiment of FIG. 1, it is to be understood that the composite optical sheet according to any one of the embodiments shown in FIGS. 7 to 18 may also be employed by the liquid-crystal display device 1. Since the optical modulation by the composite optical sheet 11 has been described above, the redundant description will be omitted.

The second polarizing layer 23 may be disposed above the composite optical sheet 11. The second polarizing layer 23 may transmit components of the incident light polarized in parallel to the transmission axis of the second polarizing layer 23 to impart a polarized state to the transmitted light. In an exemplary embodiment, the second polarizing layer 23 may be an absorptive polarizing layer that transmits components of light polarized parallel to the transmission axis and absorbs components of light polarized parallel to the absorption axis. In an exemplary embodiment, the second polarizing layer 23 may be a reflective polarizing layer. The transmission axis of the second polarizing layer 23 may be substantially in parallel to the transmission axis of the polarizing layer 500 (see FIG. 1) included in the composite optical sheet 11.

In an exemplary embodiment, the maximum distance d between the composite optical sheet 11 and the second polarizing layer 23 may be approximately 100 µm or smaller. By maintaining the distance d between the composite optical sheet 11 and the second polarizing layer 23 to 100 µm or smaller, the overall thickness of the liquid-crystal display device 1 can be reduced.

The liquid-crystal display panel 24 may be disposed on the second polarizing layer 23. The liquid-crystal display panel 24 may overlap with the light guide plate 21 and the composite optical sheet 11 in the third direction Z. The liquid-crystal display panel 24 may include a first glass 24a and a second glass 24b, a liquid-crystal layer 24c interposed between the first glass 24a and the second glass 24b, and a sealing element 24d for bonding the first glass 24a and the second glass 24b together. For example, a switching element (not shown) may be disposed between the first glass 24a and the liquid-crystal layer 24c. A color conversion pattern (not shown) such as a color filter and a quantum dot filter may be disposed between the second glass 24b and the liquid-crystal layer 24c.

The coupling member 25 may be in contact with the light guide plate 21 and the liquid-crystal display panel 24 to couple the light guide plate 21 with the liquid-crystal display panel 24. For example, the coupling member 25 may be in contact with the light guide plate 21 as well as the first glass 24a of the liquid-crystal display panel 24. The coupling member 25 may be, but is not limited to, a foam tape or a frit.

The liquid-crystal display device 1 according to the exemplary embodiment of the present disclosure may include the composite optical sheet 11 having a small thickness to reduce the overall thickness of the liquid-crystal display device 1. In addition, the composite optical sheet 11 that can provide a good coupling stability and improved luminance can eliminate an additional element for improving the rigidity and durability, thereby realizing a narrow bezel of the liquid-crystal display device 1.

Figure 20:
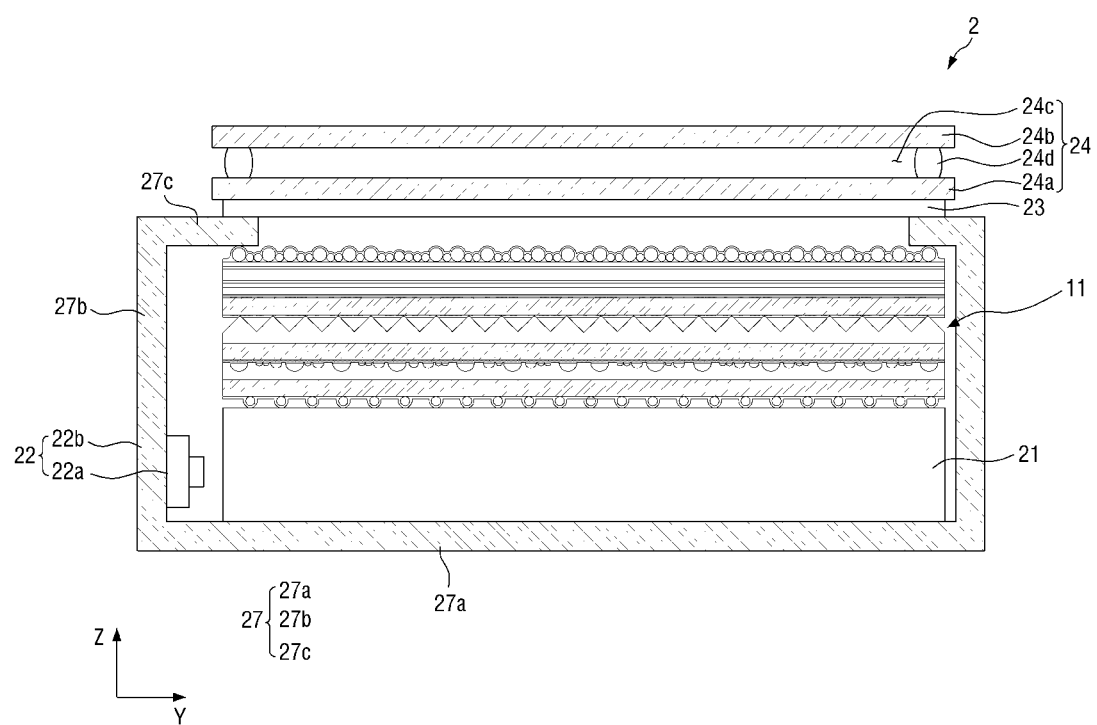
FIG. 20 is a cross-sectional view of a liquid-crystal display device according to another exemplary embodiment.

FIG. 20 is a cross-sectional view of a liquid-crystal display device according to another exemplary embodiment.

Referring to FIG. 20, the liquid-crystal display device 2 according to an exemplary embodiment may include a light guide plate 21, a light source unit 22 disposed on one side of the light guide plate 21 in the second direction Y, a composite optical sheet 11 disposed on the light guide plate 21, a second polarizing layer 23 disposed on the composite optical sheet 11, a liquid-crystal display panel 24 disposed on the second polarizing layer 23, and a housing 27 that accommodates the light guide plate 21, the light source unit 22, and the composite optical sheet 11.

The light guide plate 21, the light source unit 22, the composite optical sheet 11, the second polarizing layer 23 and the liquid-crystal display panel 24 have been described above with reference to FIG. 19; and, therefore, the redundant description will be omitted. Although the liquid-crystal device 2 shown in FIG. 20 employs the composite optical sheet 11 according to the embodiment of FIG. 1, it is to be understood that the composite optical sheet according to any one of the embodiments shown in FIGS. 7 to 18 may also be employed by the liquid-crystal device 2. Since the optical modulation by the composite optical sheet 11 has been described above, the redundant description will be omitted.

The housing 27 may include a bottom portion 27a forming the bottom surface, side walls 27b having a substantially rectangular shape protruding upward from the edges of the bottom portion 27a, respectively, and supporters 27c protruding from the side walls 27b inwardly. The bottom portion 27a, the side walls 27b, and the supporters 27c may be formed integrally without being physical divided.

The second polarizing layer 23 and the liquid-crystal display panel 24 may be disposed on the supporters 27c of the housing 27. The supporters 27c may have a predetermined area for stably supporting the liquid-crystal display panel 24.

In an exemplary embodiment, the supporters 27c of the housing 27 are disposed between the composite optical sheet 11 and the second polarizing layer 23. The supporters 27c may be in contact with the composite optical sheet 11 overlapping with the composite optical sheet 11 in the third direction Z while preventing the composite optical sheet 11 from rattling in the third direction Z.

The liquid-crystal display device 2 according to the exemplary embodiment of the present disclosure may include the composite optical sheet 11 having a small thickness, to reduce the overall thickness of the liquid-crystal display device 2. In addition, since the composite optical sheet 11 that can provide a good coupling stability and improved luminance can eliminate an additional element for improving the rigidity and durability, thereby realizing a narrow bezel of the liquid-crystal display device 2.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:
1. A composite optical sheet, comprising:
a first optical functional layer having a first surface and a second surface, the first surface comprising a reference plan; and the first optical functional layer comprising a pattern of recesses having a curvature, dented inwardly from the reference plane, the pattern of recesses having different sizes;

a first support layer disposed on the first surface of the first optical functional layer;

a first adhesive layer disposed between the first optical functional layer and the first support layer, wherein the first optical functional layer is coupled with the first adhesive layer by penetrating into the first adhesive layer at least partially;

a second optical functional layer disposed on the first support layer and comprising a pattern of prisms extended in a first direction;

a polarizing layer disposed on the second optical functional layer; and a second adhesive layer disposed between the second optical functional layer and the polarizing layer, wherein the second optical functional layer is coupled with the second adhesive layer by penetrating into the second adhesive layer at least partially, wherein a first cross section of the first optical functional layer is different from a second cross section of the second optical functional layer.

2. The composite optical sheet of claim 1, further comprising:

a second support layer disposed on the second surface of the first optical functional layer and having a surface facing the first optical functional layer and an opposed surface; and a first bead coating layer disposed on the opposed surface of the second support layer and comprising a plurality of first beads and a first binder resin surrounding the plurality of first beads.

3. The composite optical sheet of claim 2, further comprising:

a second bead coating layer disposed directly on the polarizing layer and comprising a plurality of second beads and a second binder resin surrounding the plurality of second beads, wherein a number of the first beads per unit area in the first bead coating layer is smaller than a number of the second beads per unit area in the second bead coating layer.

4. The composite optical sheet of claim 3, wherein the first optical functional layer and the second optical functional layer are made of a photo-curable resin, wherein the first binder resin and the second binder resin are made of a thermosetting resin, and wherein an elasticity of the plurality of first beads is larger than an elasticity of the plurality of second beads.

5. The composite optical sheet of claim 3, wherein a pitch of the pattern of prisms is equal to three times to seven times of an average particle size of the plurality of second beads in the second bead coating layer.

6. The composite optical sheet of claim 2, further comprising:

a third support layer disposed between the second adhesive layer and the polarizing layer and being in contact and coupled with the second adhesive layer, wherein the first support layer, the second support layer, and the third support layer have an in-plane refractive index anisotropy, and wherein a direction of a slow axis of each of the first support layer, that of the second support layer, and that of the third support layer are parallel to one another.

7. The composite optical sheet of claim 2, wherein the pattern of prisms comprises:

a first pattern of prisms extended in the first direction and having a first height, and a second pattern of prisms disposed adjacent to the first pattern of prisms, extended in the first direction, and having a second height that is smaller than the first height, wherein the first pattern of prisms is coupled with the second adhesive layer by penetrating into the second adhesive layer at least partially, and wherein the second pattern of prisms is spaced apart from the second adhesive layer.

8. The composite optical sheet of claim 2, wherein the first optical functional layer is a light-concentrating layer, wherein a maximum thickness of the first optical functional layer is smaller than a thickness of the first support layer and a thickness of the second support layer, wherein the first optical functional layer is spaced apart from the first support layer, and wherein the composite optical sheet is used for an edge-type light source assembly.

9. The composite optical sheet of claim 8, further comprising:

a second bead coating layer disposed directly on the polarizing layer and comprising a plurality of second beads, wherein an average width of the pattern of recesses in a second direction intersecting the first direction is larger than an average particle size of the plurality of second beads.

10. The composite optical sheet of claim 9, wherein the pattern of recesses comprises a first pattern of recesses and a second pattern of recesses, wherein the second adhesive layer fills the first pattern of recesses and the second pattern of recesses at least partially, and wherein a level of a surface of the second adhesive layer filling the first pattern of recesses is different from a level of a surface of the second adhesive layer filling the second pattern of recesses.

11. The composite optical sheet of claim 1, wherein the first optical functional layer comprises more than one pattern of recesses having dots shapes when viewed from a top, and wherein an area occupied by the reference plane with respect to an overall area of the first optical functional layer ranges from 30% to 50%, when viewed from the top.

12. The composite optical sheet of claim 11, wherein a width of the pattern of recesses in the first direction is larger than a width of the pattern of recesses in a second direction intersecting the first direction when viewed from the top.

13. The composite optical sheet of claim 11, wherein the pattern of recesses comprises:

a first pattern of recesses having a cross section that is a part of a first arc having a first curvature radius and a first depth, and a second pattern of recesses having a cross section that is a part of a second arc having the first curvature radius and a second depth that is larger than the first depth.

14. The composite optical sheet of claim 11, wherein the pattern of recesses comprises:

a first pattern of recesses having a first depth and a first width in the first direction that is larger than the first depth, and a second pattern of recesses having a second depth and a second width in the first direction that is smaller than the second depth.

15. The composite optical sheet of claim 1, wherein a cross section of each of the pattern of recesses is a part of an arc or elliptical arc.

16. A liquid-crystal display device comprising:
a light guide plate;
a liquid-crystal display panel disposed on the light guide plate;
a composite optical sheet interposed between the light guide plate and the liquid-crystal display panel; and
a light source disposed on a side of the light guide plate in a first direction,
wherein the composite optical sheet comprises:
a first optical functional layer having a first surface and a second surface, the first surface comprising a reference plane, and the first optical functional layer comprising a pattern of recesses having a curvature and dented inwardly from the reference plane, the pattern of recesses having different sizes;
a first support layer disposed on the first surface of the first optical functional layer;
a first adhesive layer disposed between the first optical functional layer and the first support layer, wherein the first optical functional layer is coupled with the first adhesive layer by penetrating into the first adhesive layer at least partially;
a second optical functional layer disposed on the first support layer and comprising a pattern of prisms extended in a second direction intersecting the first direction;
a first polarizing layer disposed on the second optical functional layer; and
a second adhesive layer disposed between the second optical functional layer and the first polarizing layer, wherein the second optical functional layer is coupled with the second adhesive layer by penetrating into the second adhesive layer at least partially,
wherein a first cross section of the first optical functional layer is different from a second cross section of the second optical functional layer.

17. The liquid-crystal display device of claim 16, further comprising:
a second polarizing layer disposed between the composite optical sheet and the liquid-crystal display panel,
wherein a maximum distance between the composite optical sheet and the second polarizing layer is equal to or smaller than 100 µm.

18. The liquid-crystal display device of claim 16, wherein the liquid-crystal display panel comprises a first glass and a second glass facing each other, and a liquid-crystal layer interposed between the first and the second glasses,
wherein the light guide plate is made of a glass material, and
wherein the liquid-crystal display device further comprises a coupling member that is in contact with the light guide plate and the first glass and couples the light guide plate with the first glass.

19. The liquid-crystal display device of claim 17, further comprising:
a housing accommodating the light guide plate, the light source, and the composite optical sheet,
wherein the housing comprises a bottom portion, side walls protruding upwardly from the bottom portion, and supporters protruding inwardly from the side walls to overlap with the composite optical sheet and supporting the liquid-crystal display panel, and
wherein the supporters are disposed between the composite optical sheet and the second polarizing layer and are in contact with the composite optical sheet.

20. The liquid-crystal display device of claim 16, wherein a cross section of each of the pattern of recesses is a part of an arc or elliptical arc.

* * * * *